United States Patent [19]

Askinazi et al.

[11] 4,453,211

[45] Jun. 5, 1984

[54] SYSTEM BUS FOR AN EMULATED MULTICHANNEL SYSTEM

[75] Inventors: Martin Askinazi, Dresher, Pa.; Liam McManus, Willingboro, N.J.; Paul R. Malnati, Delran, N.J.; Charles L. Kapeghian, Vincentown, N.J.

[73] Assignee: Formation, Inc., Mt. Laurel, N.J.

[21] Appl. No.: 258,514

[22] Filed: Apr. 28, 1981

[51] Int. Cl.³ .................. G06F 15/16

[52] U.S. Cl. .................. 364/200

[58] Field of Search ... 364/200 MS File, 900 MS File

[56] References Cited

U.S. PATENT DOCUMENTS

| | | | |
|---|---|---|---|
| 3,755,789 | 8/1973 | Collins | 364/200 |
| 3,879,710 | 4/1975 | Mayemchuk et al. | 364/200 |
| 3,886,524 | 5/1975 | Appelt | 364/200 |
| 3,940,743 | 2/1976 | Fitzgerald | 364/200 |
| 4,038,641 | 7/1977 | Bouknecht et al. | 364/200 |
| 4,096,572 | 6/1978 | Namimoto | 364/200 |
| 4,149,241 | 4/1979 | Patterson | 364/200 |
| 4,195,351 | 3/1980 | Barner et al. | 364/900 |
| 4,204,251 | 5/1980 | Brudevold | 364/200 |
| 4,209,838 | 7/1980 | Alcorn, Jr. et al. | 364/200 |
| 4,245,307 | 1/1981 | Kapeghian et al. | 364/200 |
| 4,253,148 | 2/1981 | Johnson et al. | 364/200 |

*Primary Examiner*—Jerry Smith
*Assistant Examiner*—Gary V. Harkcom
*Attorney, Agent, or Firm*—Ratner & Prestia

[57] ABSTRACT

A single synchronous system bus interconnecting a number of distributed processors which emulate multiple channels of a multichannel system. The system uses multichannel software and each channel is distributed among all of the distributed processors. The bus provides for communication among the distributed processors and a memory controller. One of the distributed processors accepts and converts multichannel software and transmits formatted words on the system bus and another of the distributed processor stores the instruction received in the formatted words. The first processor, thereby, acquires control over the system bus and the second processor, as slave, processes the instruction received in accordance with its microde programming, generates data transfer control signals and transmits formatted words via the system bus destined for a distributed processor or main memory controller. The processor which transmitted the formatted words to a destination device relinquishes control of the system bus and the destination device acquires control of the system bus for processing the words transmitted to it.

22 Claims, 26 Drawing Figures

SLAVE MODE TIMING

MASTER MODE TIMING

SYSTEM BUS FOR AN EMULATED MULTICHANNEL SYSTEM

TABLE OF CONTENTS

Background of the Invention
I. Field of the Invention
II. Background Art
Summary of the Invention
Brief Description of the Drawings
Description of Illustrative Embodiment
I. General Description
II. System Bus 25 Description
III. System Bus Data Formats
IV. System Bus Timing
V. Instruction Processor/Input-Output Processor 28
A. System Bus Interface 90
1. Data Input Register (DIR) 112
2. DAL/PL Transceiver 100
3. Interrupt Register (IR) 114
4. Data Output Registers (DOR) 118
5. Address Recognition Comparator 116
6. Status Register 92
7. WCL Register 98
8. Mode Register 108 Table 1
9. Interface Control Logic 110
B. IP/IOP Field K 62 Definitions
Table 2
C. Microprocessor (Bit-Slice) 86
Table 3
Table 4
Table 5
D. Memory 84
E. IOP (DISC) Interface **28*a***
Table 6
VI. Low Speed Input-Output Processor 30
A. Microprocessor 170
Table 7
B. Memory 174
Table 8
Table 9
C. Serial I/O 176
D. System Bus Interface 172
E. LSIOP K-Field Definitions
F. LSIOP 31
G. LSIOP 32
H. Service Processor—SCP 26
VII. Main Memory Controller MMC(29)
Table 9A
VIII. Intercommunications between Processors
A. General Interprocessor Communications
B. The Registers of IP/IOP 28 System Bus Interface 90
C. The Registers of LSIOP 30 System Bus Interface 172
D. Interprocessor Messages
Table 10
Table 11
IX. Table of Components
Appendixes
I. Appendix I
II. Appendix II
A. Table II-1
III. Appendix III
A. Table III-1
B. Table III-2

BACKGROUND OF THE INVENTION

A. Field of the Invention

This invention relates to data processing systems and more specifically to a distributed processing system for emulating multiple channels of a multichannel system having a single synchronous bus.

B. Background Art

Channel architectured systems perform input-output (I/O) data transfers between instruction processors (IP) and multiple peripheral devices by utilizing a dedicated I/O channel configuration. Coupled to each dedicated channel in the IP is at least one device controller, and each device controller is, in turn, coupled to at least one peripheral device. This I/O channel configuration permits the IP to communicate with several peripheral devices by way of the IP's multiple channel capability. The I/O channel configuration permits concurrent I/O data transfers on each channel. Each of these dedicated channels communicates with multiple device controllers, and each of the device controllers communicates with multiple peripheral devices.

In this I/O configuration, I/O instruction processing and channel management for each channel is primarily performed by the IP. This processing and managment is accomplished by the IP on a cycle stealing basis. Also, during a data transfer, a channel can operate in a burst mode. Burst mode operation dictates that once a multiple word data transfer begins on a channel, no other device controller can utilize that channel until the current data transfer has been completed.

In the channel architectured system I/O operations require extensive use of the IP. Other functions, such as data processing, cannot be performed while the IP is supporting channel operations.

Various channel architectured systems are known in the art. The principal channel architectured operating systems are DOS/VS, OS/VS1 and VM/370 of IBM. Such channel architectured systems require extensive hardware, consisting of an instruction processor having hardware channels, that require dedicated and costly controllers.

Therefore, it is an object of this invention to provide a high performance architecture which emulates a multichannel architecture but at a much lower cost by using distributed processors that communicate over a single synchronous system bus. These distributed processors are made up of microprocessor modules which perform the dual function of system bus controller and device controller.

SUMMARY OF THE INVENTION

A single synchronous system bus for a distributed processor system which emulates multiple channels of a multichannel operating system using multichannel software instructions written for the operating system. Each channel is distributed among a number of distributed processors. The single synchronous system bus follows a protocol for the granting of bus control to any one of the distributed processors to become the master processor and for transmitting an address word onto the synchronous system bus from the master processor. The address word defines the slave member and contains the emulated channel and device addresses, so that any one of the distributed processors can become the slave of the master processor, where all of the distributed processors have the same dedicated channel address. The slave processor is able to determine whether it is being requested to perform a task by the master processor. After the slave acknowledges the request, a data word is transmitted onto the synchronous system bus between the master processor and the slave processor, and the master processor relinquishes bus control. The master processor accepts and converts the multichannel software instructions into the address and data word formats of the synchronous system bus, and the slave processor stores and processes the multichannel software instruction. Thereafter, the slave processor acquires control over the bus in order to transmit formatted words containing a data message. It then relinquishes control of the system bus. Another processor acquires control over the synchronous system bus for accepting the data message.

DESCRIPTION OF ILLUSTRATIVE EMBODIMENT

I. General Description

Figure 1:
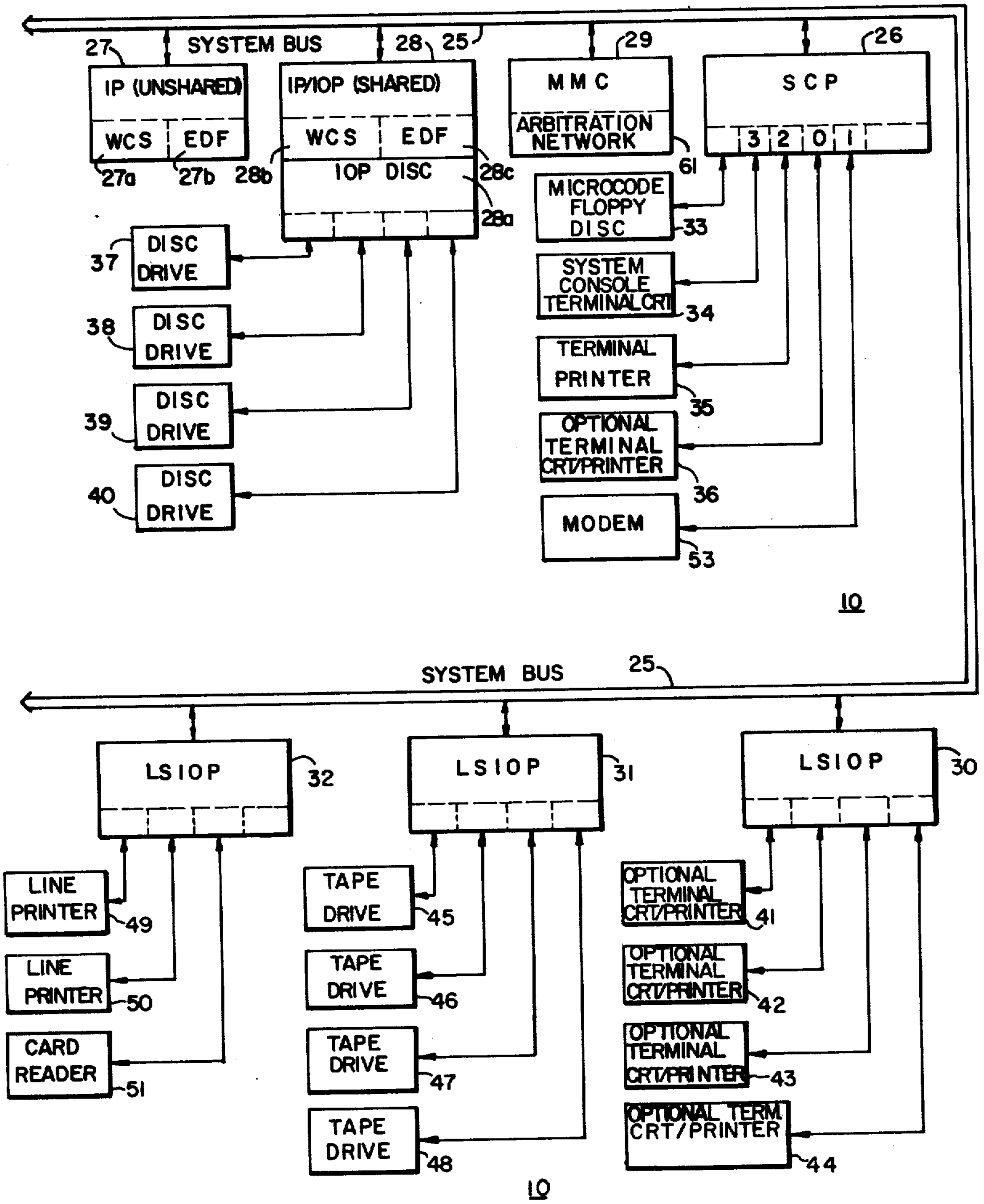
FIG. 1 illustrates in block diagram form the general configuation of a data processing system embodying the invention.

FIG. 1 shows the general configuration of a program equivalent (PE) architectured data processing system 10. A PE architectured system performs I/O data transfers between an IP and multiple peripheral devices by utilizing a plurality of distributed processors all interconnected by one system bus. As shown, PE architectured data processing system 10 comprises a plurality of distributed processors 26–32 interconnected by way of a 63 bit, synchronous bus or system bus 25 where each processor contains channel emulation microcode. Through interaction of system bus 25 protocol and channel emulation microcode, PE architectured system 10 can be operated utilizing channel architecture system software, where imulated channels can be distributed among processors 26, 28, 30, 31 and 32. System 10 includes service processor (SCP 26), instruction processor (IP) 26, instruction processor/input-output processor (IP/IOP) 28, main memory controller (MMC 29), and low speed input-output processor (LSIOP) 30, 31, and 32.

System bus 25 provides the communication link between processors 26–32 in processor system 10. The system bus includes data, address and control lines which are tied to every processor. If a processor wishes to initiate communication on system bus 25, it must first gain control over the bus. Once granted control, the initiating processor is known as the bus master; the other processor being communicated to is known as the bus slave. All processors, except MMC 29, can gain control over system bus 25. MMC 29, however, can only act as a slave, never as a master.

The sequence of granting control to a requesting processor is controlled by an arbitrator, located in MMC 29, and will be described in detail later. When a processor is requesting control, the arbitrator determines whether the request has sufficient priority. If it does, the requesting processor is made master over system bus 25.

All communications on system bus 25 follow a specific format, determined by the type of transfer being communicated on the bus. In general, each communication on system bus 25 occurs in what is known as a system bus cycle. A bus cycle starts by one distributed processor requesting control over the bus; being granted such control; next transmitting an address word on the system bus destined to a preselected processor; followed by the placement of a data word on the system bus; and finally the controlling processor relinquishing control over the bus. The address word always originates from the controlling master processor; the data word, however, may originate from the master processor or from the slave processor. For example, in case the master wishes to write data to the slave, the data word originates from the master; on the other hand, if the master wishes to read data from the slave, the data word originates from the slave.

The newly appointed bus master begins the data communication by issuing an address word which contains the address of the intended destination. All other processors, during a designated time, monitor system bus 25. When the address contained in the word issued by the bus master matches the address of a monitoring processor, the latter assumes the role of slave. The address word also contains information for the slave as to what function is to be performed during this system bus cycle. If the master informs the slave that the former wishes to write data to the latter, the slave accepts the subsequent data word placed on the bus by the master; if, on the other hand, the master wishes to read data from the slave, the slave subsequently places the data word on the bus to be accepted by the master. At this time the information transfer is complete and the bus master relinquishes control over system bus 25. If the slave processor wishes to reply, it must repeat the previously described sequence, except that the replying processor now assumes the role of bus master.

There are three types of system bus cycles: a memory reference bus cycle, a memory control bus cycle, and an interprocessor transfer cycle. Each cycle is comprised of the same sequence described above, the difference being the function to be performed as provided by the address word transmitted on system bus 25. In a memory reference bus cycle, the controlling processor acts as master over MMC 29. During this cycle, data can be read from or written to MMC 29 under control of the master processor. The bus cycle sequence is similar to that described above, except that MMC 29 can only act as a slave on system bus 25.

The second type of cycle, the memory control bus cycle, is similar to the memory reference cycle, except that the master processor is either reading or writing control data from or to MMC 29. Such control data may consist of read or write protect keys, data inhibiting error correcting codes or other memory control data.

Lastly, the third type of cycle, which is specifically described in VIII, the interprocessor transfer cycle, is a bus cycle during which a processor, such as IP 27 or IP/IOP 28, communicates with another processor, such as LSIOP 30, 31, or 32. In this type of transfer cycle either processor may act as master while the other is acting as slave. Like the other cycles, the interprocessor transfer cycle has the same bus sequence described earlier.

As will be explained later, during system initialization, each of the processors is configured (by way of microcode programming) to perform a particular function such as instruction processing (in the case of FIG. 1, IP 27 and IP/IOP 28) or input/output processing (in the case of FIG. 1, IP/IOP 28, LSIOP 30, 31 and 32). The I/O configuration in PE architectured system 10 permits an IP to communicate with any or all IOP's by way of system bus 25 and to support concurrent I/O data transfers from any or all IOP's. Each IOP, in turn, performs the dual role of a system bus controller and a device controller.

It is understood that the IOP's are transparent to the other elements of the PE architectured system 10. The reason for this is that it is the device controller function of each IOP that communicates with the multiple peripheral devices via emulated or simulated channels so that the data processing of system 10 is compatible with multichanneled architectured software. Specifically, I/O requests are effectively made to the device controller within each IOP. Thus, it is the dual role of device controller and channel emulator that IOP's perform rather than their physical characteristics as processors that is significant from the standpoint of the function of the other components of the system.

Each device controller in the IOP's may or may not support concurrent I/O data transfers on each peripheral device bus. By eliminating physical channels and utilizing a single system bus, such as bus 25, in conjunction with intelligent IOP's, the I/O operations of system 10 does not require extensive use of an IP. Note also that an emulated channel can be distributed among multiple processors 26, 28, and 30–32. An example of this would be two LSIOP's both emulating dedicated IP channel 0 where the various device controllers (subchannels) of dedicated channel 0 would be emulated by a particular LSIOP. Before an I/O operation is performed, an IP, such as IP 27, will store a group of words (called channel address words (CAW) and channel command words (CCW)) in the MMC 29. The CCW's are a group of commands required to perform some I/O operations. The CAW acts as a pointer and contains the memory address location in the MMC 29 of a particular group of CCW's. During an I/O operation IP 27 issues a start I/O command to a specific LSIOP (30, 31, or 32). Upon receipt of this "start I/O instruction" the LSIOP will fetch a CAW from the MMC 29. This CAW points to a specific group of CCW's in MMC 29 which the LSIOP will begin to fetch and execute. During this execution the LSIOP will generate all required control signals needed to communicate with the addressed peripheral device. Specifically, the LSIOP was instructed to function as a peripheral device controller. The LSIOP is configured to emulate, using its own microcode, the channels of a multichannel architectured operating system during an I/O operation of the PE architectured system 10. For example, the LSIOP processes the data message transmitted to it and then generates its own control signals needed to transfer data on emulated channels between a peripheral device and itself. That is, it constructs a memory write transfer message to get the data from the peripheral back to itself and subsequently to some other system device. The LSIOP then requests bus control in order to transmit the transfer address and data message on the system bus to that other system device. Thus, the PE architecture permits IP 27 to perform other system tasks while LSIOP 31 processes and executes all CAW and CCW's for a particular I/O operation.

As will also be explained later, true concurrent data transfers between system bus members is realizable, since system 10 does not permit any processor to operate in a burst mode. This is accomplished by utilizing a bus arbitrator, such as the bus arbitrator in MMC 29, to determine which processor should be given access to system bus 25. This determination is made on a system bus cycle by system bus cycle basis.

System 10 provides the capability of executing, without modifications, all channel architectured operating systems, such as DOS/VS, OS/VS1 and VM/370. This is achieved by having each processor in system 10 emulate the channel architecture of the above operating systems. The program equivalency is simulated by microcode programming. Since each processor emulates the previously described channel architecture, any processor may communicate with any other processor and read or write data to any peripheral device attached to the emulated channels in the system.

The manner in which the processors in system 10 communicate with one another will now be described. When a processor in system 10 desires to gain access to bus 25, it requests to be made bus master. The bus arbitration logic in MMC 29 evaluates the bus request. If no requests of higher priority exist, then the requesting processor is granted bus control. Once granted control, the processor addresses a command to another member, coupled to system 10, with which it desires to perform some function, such as a read or write operation. The addressed member acknowledges receipt of the command and, at this point, a master-slave relationship exists in system 10. The processor originating the command is the master and the processor that was addressed is the slave. If the slave is busy performing another function and cannot service the master, the slave returns a busy status; if, however, the slave is not busy it issues a status word indicating that the commanded action has been accepted.

Interprocessor communications, including address, data, commands, maintenance, status, and control signals are time shared on system bus 25. At each processor, system bus 25 interfaces with (1) address recognition logic for processor identification, (2) data input registers, (3) data output registers, (4) interrupt registers for storing real and emulated interrupt flags, (5) parity verification logic, (6) system bus 25 status registers, and (7) control registers for supporting system bus 25 communications protocol.

Each processor is tasked with a particular system function. Service processor (SCP) 26 is the hub of processor system 10. SCP 26 is tasked with the nonemulation functions of automated system "start-up" following power-on, and diagnositics control. Following power-on, all processors in system 10 run self confidence tests. Upon successful completion of the self confidence tests, each processor awaits activation by SCP 26. Prior to activation SCP 26 loads microcode into its internal memory from floppy disk 33. Subsequently, SCP 26 sequentially activates processors 27–32 and defines the optimum system configuration. SCP 26 then loads, by way of floppy disk 33, the respective emulation microcode or microdiagnostic code in each of processors 27–32 to conclude start-up.

Processor system 10 is now ready to be initialized. At this point SCP 26 provides channel and device controller emulation to system console CRT/keyboard 34, low performance printer 35, optional CRT/printer 36 (used for emulated maintenance data display and emulated diagnostic control), and telephone modem 53 (used for system access from remote terminal 54 for system control or maintenance and diagnostic control).

Instruction processor (IP) 27 and instruction processor/input-output processor (IP/IOP) 28 can be configured in a shared or unshared operating mode. For example, in the unshared mode IP 27 accepts and converts channel architectured software instructions into processor system 10 instructions required to perform the commanded operation. This conversion is performed by the IP 27 through the use of a mapping technique as follows. The channel architectured software instruction is fetched from the MMC 29. The OP code of this instruction is effectively used as a vector to a location in an internal storage medium in the IP 27 which contains the starting addresses of all the microprogrammed conversion microcode. Each OP code defines a unique starting address and therefore a specific conversion routine. This starting address is used by the IP 27 microprocessor to locate and execute that specific conversion routine. It is this executed microcode which generates all the system 10 instructions required to perform the function requested by the software instruction OP code.

In the shared mode, IP/IOP 28 supports both IP and IOP functions concurrently. The IP function is identical to that described for IP 27 while the IOP function, provided by IOP (disc) interface 28*a*, provides a dual role of emulating a channel architecture and acting as a disc device controller for disc drives 37–40. This shared mode allows (1) concurrent instruction processing and disc I/O servicing and (2) multiple disc support and concurrent disc I/O operation (search/read/write).

Main memory controller (MMC) 29 provides random access memory (RAM) for processor system 10. Controller 29 also provides detection of multibit errors and error correction of one bit per 32 bit word. It also supports the system bus arbitration logic. The MMC 29 interface to system bus 25 will be described in detail later.

Low speed input-output processor (LSIOP) 30–32 provide reception and transmission of information to peripheral devices, such as keyboards 41–43, CRT terminals 41–43, printer 49, tape drives 45–48, and card readers 51. Each LSIOP 30–32 functions both as a channel emulator and as a peripheral device controller supporting multiple channel/multiple device controller operation. Each LSIOP 30–32 responsibilities include processing I/O instructions from an IP, fetching channel address words (CAW) and channel program command words (CCW's) from the MMC, processing CCW's and resultant data accesses to and from the MMC and peripheral devices, fabricating channel status word (CSW) as defined by the emulation microcode and storing it when required on I/O instruction processing.

The following example describes the system 10 sequences required to process a channel architectured software instruction that requests a data transfer from tape drive 46 to MMC 29. An IP, such as IP 27, issues a request on system bus 25 to acquire bus mastership. This request is detected by the arbitration network (this arbitration network is composed of the arbitrator in MMC 29 and the priority circuit in each processor 27–32). The request is granted if the IP 27 has sufficient priority. As bus master the IP 27 issues a memory transfer instruction to the MMC 29 requesting an instruction to be fetched. The MMC 29 will place the requested instruction on the system bus and the IP 27 reads this instruction. The IP 27 then relinquishes control of the bus. This operation occurs in one bus cycle. The IP 27 converts this software instruction into the required system 10 instruction through the use of the mapping routine previously described. It will be understood that an IOP 28 or an LSIOP (30, 31, 32) could have converted the software instruction if either one of these types of processors had initially gained control of the system bus and requested a similar data transfer operation. All processors contain the micocode necessary to convert multichannel architectured system software into the instruction format of the single synchronous bus system. When the conversion is complete the IP 27 will again request bus control as previously described. When granted, the IP 27 places an instruction on the bus that contains (1) the address of the processor the IP 27 wishes to communicate with, in this case LSIOP 31, (2) the IP 27's own address, and (3) a message code that defines the operation to be performed (in this example the message code would be "start I/O"). If not busy the LSIOP 31 acknowledges receipt of this instruction. The IP 27 relinquishes bus control and the bus cycle ends. The LSIOP 31 requests bus control and when granted will issue a memory transfer read instruction. This instruction causes the channel address word (CAW) to be fetched from MMC 29. This CAW contains the main memory address of the first channel command word (CCW) in a chain of commands. When the CAW is decoded by the LSIOP 31 this IOP again requests bus control, and when granted will issue another memory transfer read instruction. This instruction fetches the first CCW. The CCW command indicates the operation to be performed by the emulated channel. It is at this point where the LSIOP 31 performs the dual role of channel emulator and device controller. The LSIOP 31 will interleave the operations of fetching CCW's via the system bus 10 and processing the CCW's as they are received. This processing involves converting the CCW instructions it receives into the required peripheral control signals by utilizing the same mapping technique described for the IP 27. These signals include all the required addresses and read control signals needed to read the data that was originally requested by the channel architectured software instruction. Once this data is serially read into the LSIOP 31 the LSIOP 31 will construct the system bus 25 instruction needed to transfer this data to the desired MMC 29 memory location. When this instruction construction is complete the LSIOP 31 will request bus control. When bus control is granted the LSIOP 31 will place a memory transfer write instruction on the system bus 25 that will contain the real memory address and the data (acquired from tape drive 46) to be written into that address location. The MMC 29 acknowledges receipt of this instruction and the bus cycle ends. The MMC 29 now writes the data into the specified memory location. This completes the system 10 sequence example.

II. System Bus 25 Description

Figure 2:
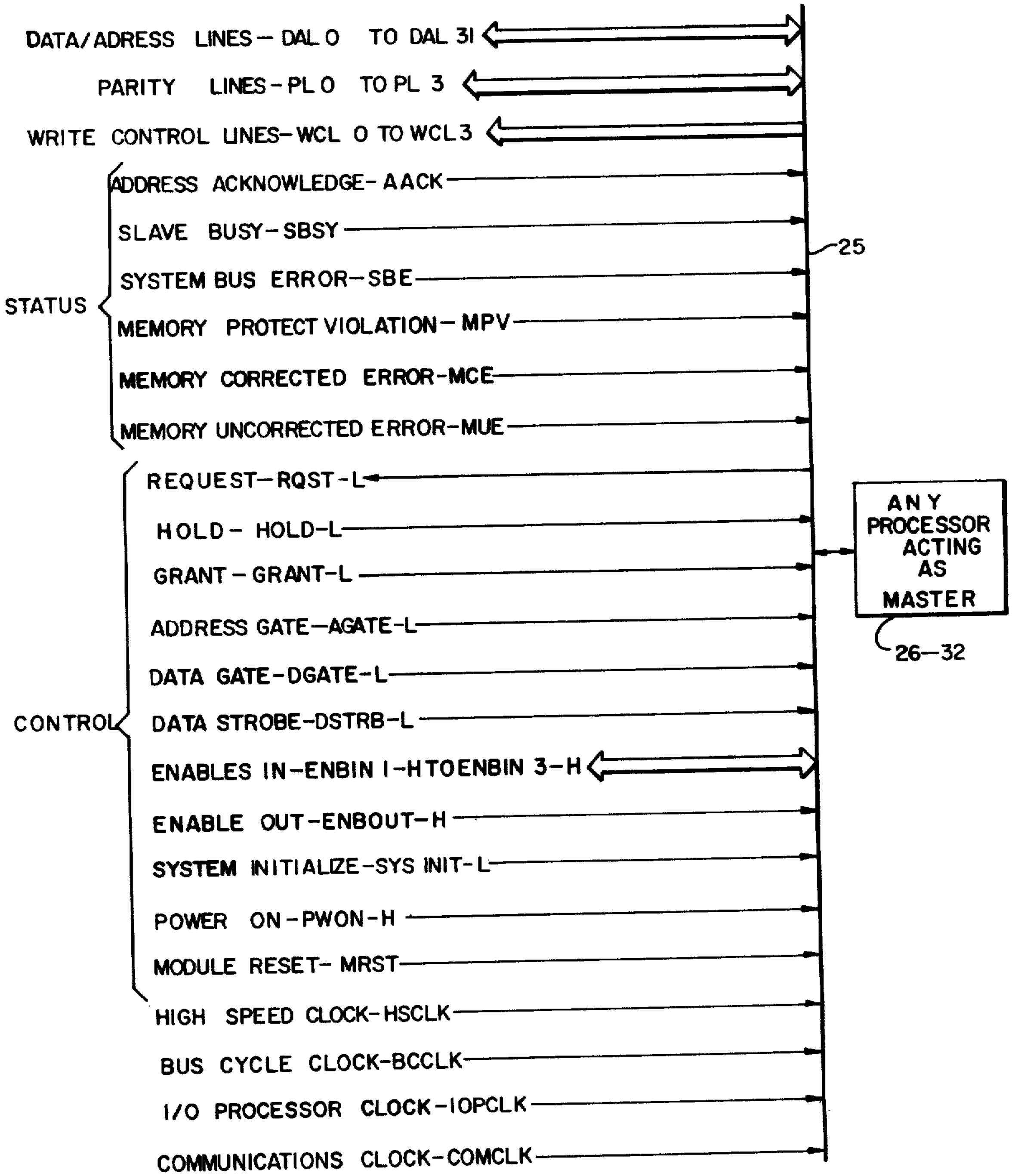
FIG. 2 illustrates in diagrammatic form the address, data, control, command and status signal lines comprising the single synchronous system bus.

System bus 25 provides the communications link between processors 26–32 in processor system 10. FIG. 2 illustrates the signal lines comprising bus 25. As shown, DAL 0 through DAL 31 are 32 data/address lines over which protect key, address and data information are communicated to all bus members. Address information is first placed on the bus by one of the processors 26–32 acting as a master. The master then receives data from or outputs data to a slave processor. Also shown in FIG. 2 are PL 0 through PL 3 which are 4 parity lines that provide odd parity for each byte of bus address or data information. PL 0 provides parity based on DAL 0 through DAL 7; PL 1 provides parity based on DAL 8 through DAL 15; PL 2 provides parity based on DAL 16 through DAL 23; and PL 3 provides parity based on DAL 24 through DAL 31. Further shown in FIG. 2 are WCL 0 through WCL 3 which are 4 write control lines presented by the master during the entire bus cycle to determine whether the operation to be performed is a slave read or write. Activating the associated WCL causes a byte of information to be written at the slave member. Valid parity must first, however, be presented for all address and data bytes to be written or to be left unmodified. The WCL 0–3 lines may be used to write a single byte or all combinations of multiple bytes. It will be understood that WCL 0 is associated with DAL 0 through DAL 7, WCL 1 is associated with DAL 8 through DAL 15, WCL 2 is associated with DAL 16 through DAL 23, and WCL 3 is associated with DAL 24 through DAL 31.

As shown in FIG. 2, six status lines are used by the bus master to determine any abnormal conditions with the bus cycle. Status of the current bus cycle is presented by the slave or, in some cases, independent bus monitoring circuits. Address acknowledge status is returned by the slave to provide a positive indication that the slave has recognized its address during the address portion of the bus cycle. Slave busy status is returned by the slave whenever the attempted bus cycle was not completed due to the slave performing other operations. System bus error status is returned to the master by either the slave or some other system monitoring circuits (located in MMC 29) indicating that the bus cycle was not completed due to a parity error being detected during the address or data transfer portion of the bus cycle (this includes key memory parity errors and other hard illogical bus failures). Memory protect violation status is provided by the system monitoring circuits indicating that the master does not have access to the addressed main memory location. This status is also activated when a key memory parity error is detected. Memory corrected error status is provided by MMC 29 whenever a corrected error has been presented to system bus 25 or written into MMC storage location. A memory uncorrected error status is provided by MMC 29 whenever the error correcting circuits cannot correct data read from a storage location or there is a key memory parity error.

System bus 25 provides for 11 control signals to determine bus operation. The request control signal is a common line from processors 26–32 to the arbitrator (located in MMC 29) used to request bus control. The hold control signal is a line from the arbitrator to processors 26–32 used to inhibit new requests. The grant control signal is a line from the arbitrator to processors 26–32 used to select the next system bus master. The address gate control signal is a line from the arbitrator to processors 26–32. It is used by the bus master to gate an address on bus 25. The data gate control signal is a line from the arbitrator to processors 26–32 used either by the master to gate write data onto system bus 25 or by the slave to gate read data onto the system bus. The data strobe control signal is a line from the arbitrator to processors 26–32 used either by the master to store system bus read data or by the slave to store system bus write data. The enable input control signals, which are three input lines to a processor from a higher priority processor, are used to determine the next bus master. The enable output control signal is a line from a processor to a lower priority processor which allows the former to become bus master. The system initialize control signal requests processors 26–32 to initialize their control logic. The power on control signal provides detection of power failure to processors 26–32. Finally, the module reset is a control signal that provides an independent radial reset capability to all processors 26–32.

Lastly, as shown in FIG. 2, system bus 25 provides four clock lines to all bus users. These lines are: a high speed clock (19.6608 MHz), a bus cycle clock (4.9152 MHz), an I/O processor clock (3.932 MHz), and a communications clock (4.9152 MHz).

III. System Bus Data Formats

All communications on system bus 25 follow a specific format. Typically, after a processor has acquired control over system bus 25, it outputs onto the bus an address format 72, shown in FIG. 3. Address format 72 is then followed by another system bus format, data format 82, shown in FIG. 4. Address format 72 always originates from the initiating processor, the master. Data format 82 may originate from the master; however, it may also originate from the slave in response to the previous address format 72. For example, in case the master wishes to write data to the slave, data format 82 originates from the master; in case the master wishes to read data from the slave, data format 82 originates from the slave. Whichever is the case, the sequence of acquiring bus control, followed by the output on system bus 25 of address format 72, followed by the output on the bus of data format 82, and finally the relinquishing of bus control completes one bus cycle.

Figure 3:
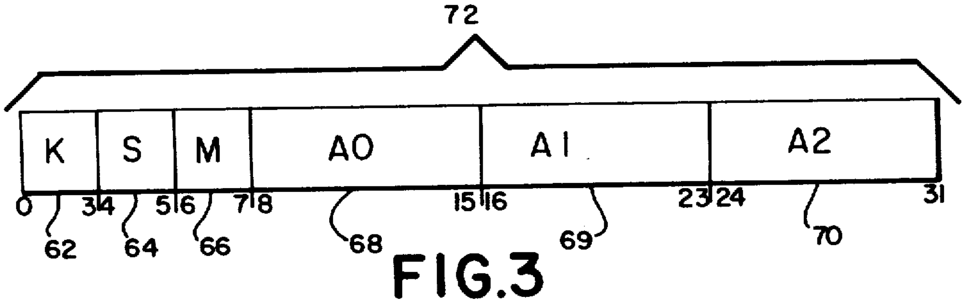
FIG. 3 illustrates the fields of the address word format.

Address data format 72, shown in FIG. 3, is composed of 6 fields: K 62, S 64, M 66, A0 68, A1 69 and A2 70. These occur upon the activation of the address gate control signal. Field S 64 defines the slave member address and message type or class of transfer for the current system bus cycle. Fields K 62, M 66, A0 68, A1 69, and A2 70 specify different bus cycle operating parameters for each S field transfer type. During a memory reference bus cycle (S=00), field K 62 contains the memory protect key value. During the same cycle, fields A0 68, A1 69 and A2 70 contain the real memory address, and field M 66 contains the address match logic control (where M=00 indicates inhibit match, M=01 indicates IP operand store, M=10 indicates I/O cycle, and M=11 indicates an instruction fetch). During a memory control transfer cycle (S=01), field K 62 specifies the function to be performed (these functions will be described in detail later). An S field of $10_2$ defines an IOP message transfer while an S field of $11_2$ indicates an IP message transfer. During an interprocessor transfer cycle (S=10 or 11), field K 62 specifies the system bus interface function to be performed (these functions will be described in detail later). Field M 66 contains the emulated channel address, and field A0 68 contains the emulated device controller/device component address. Fields not required for a particular transfer are at zero logic.

Figure 4:
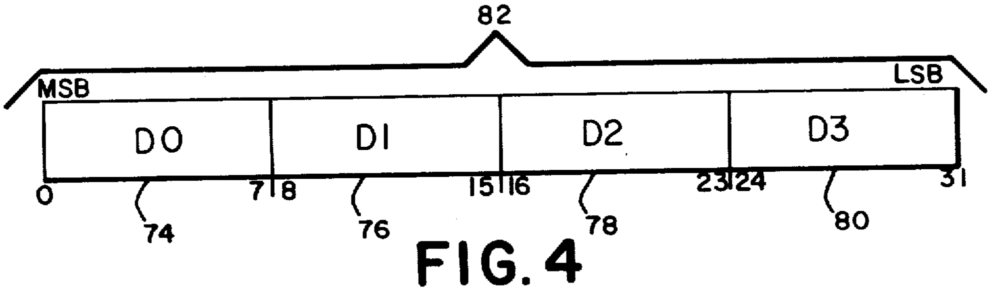
FIG. 4 illustrates the fields of the data word format.

Another system bus data format is shown in FIG. 4. As shown, data format 82 is comprised of 4 eight bit data bytes 74, 76, 78 and 80. These occur upon activation of the data gate control signal.

Data format 82 is written to the addressed processor (slave) in a single system bus cycle. The formats of the 32 bit messages are listed below.

FORMAT 1

D0, 74 (0–7)—Message Code (see Table 10 and Appendix II)

D1, 76 (8–15)—Slave 'device' address (device controller—device address if IOP). Corresponds to the A0-field in the system bus address.

D2, 78 (16–17)—Slave 'channel' address. Corresponds to the M-field in the system bus address.

D2, 78 (18)—On IP to IOP messages, this bit reflects the state of Control Register 0 bit 0, the Enable Block Multiplexer Mode bit.

D2, 78 (19–21)—Must be zero.

D2, 78 (22–23)—Master 'channel' address. This is used as the M-field of the system bus address on any reply to the message.

D3, 80 (24–31)—Master 'device' address. This is used as the A0-field of the system bus address on any reply to the message.

FORMAT 2

Same as Format 1 but master and slave addresses are reversed.

As can be seen from the above formats, each word contains the address of the master sending the message and the address of the slave receiving the message. During system initiation IP 27 and IP/IOP 28 are each informed of its own address and of its corresponding member's address. As a system integrity check, each member also validates its own address and its corresponding member's address.

Each message code is unique without regard to message direction.

IV. System Bus Timing

All users of system bus 25 are granted access to the bus on a priority arbitration basis. A user's priority level is determined by that users hardwired position in arbitration network 61 contained in the MMC block, FIG. 1. FIG. 13(*a*) illustrates an arbitration network 61 where user #1, 55*a*, holds the highest priority and user 55*f* #6 holds the lowest priority and RQST-L 57, HOLD-L 58, and GRANT-L 59 system bus signal lines are daisy chain connected between arbitrator 56 and all users 55*a*–*f*. When one or more users activate the RQST-L, line 57, arbitrator 56 generates hold signal 58 to inhibit further requests. Arbitrator 56 then issues grant signal 59 and the requesting user having the highest priority becomes bus master.

Figure 13A:
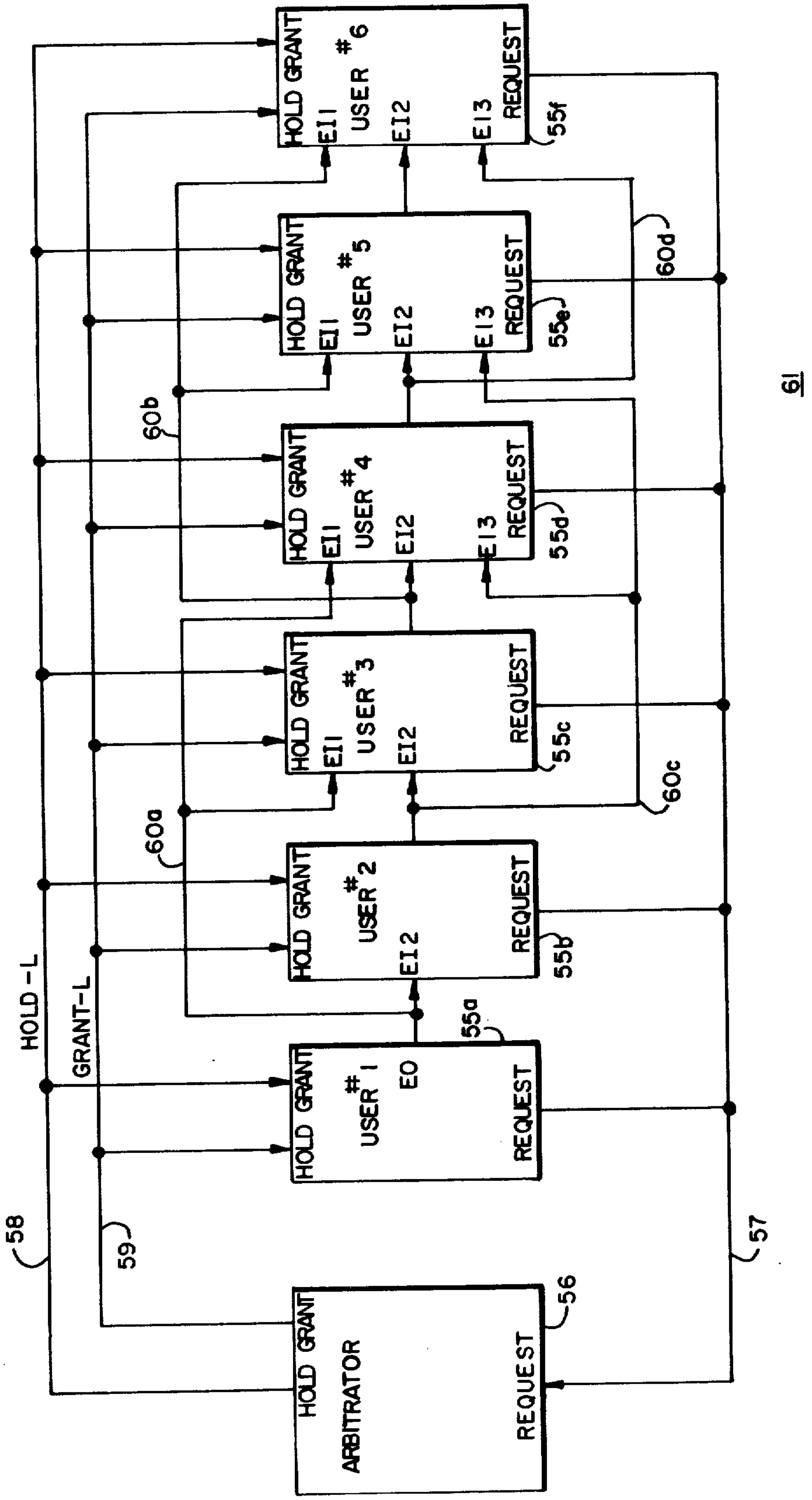
FIG. 13*a* illustrates in block diagram form an arbitration network contained in main memory control shown in FIG. 1.
Figure 13B:
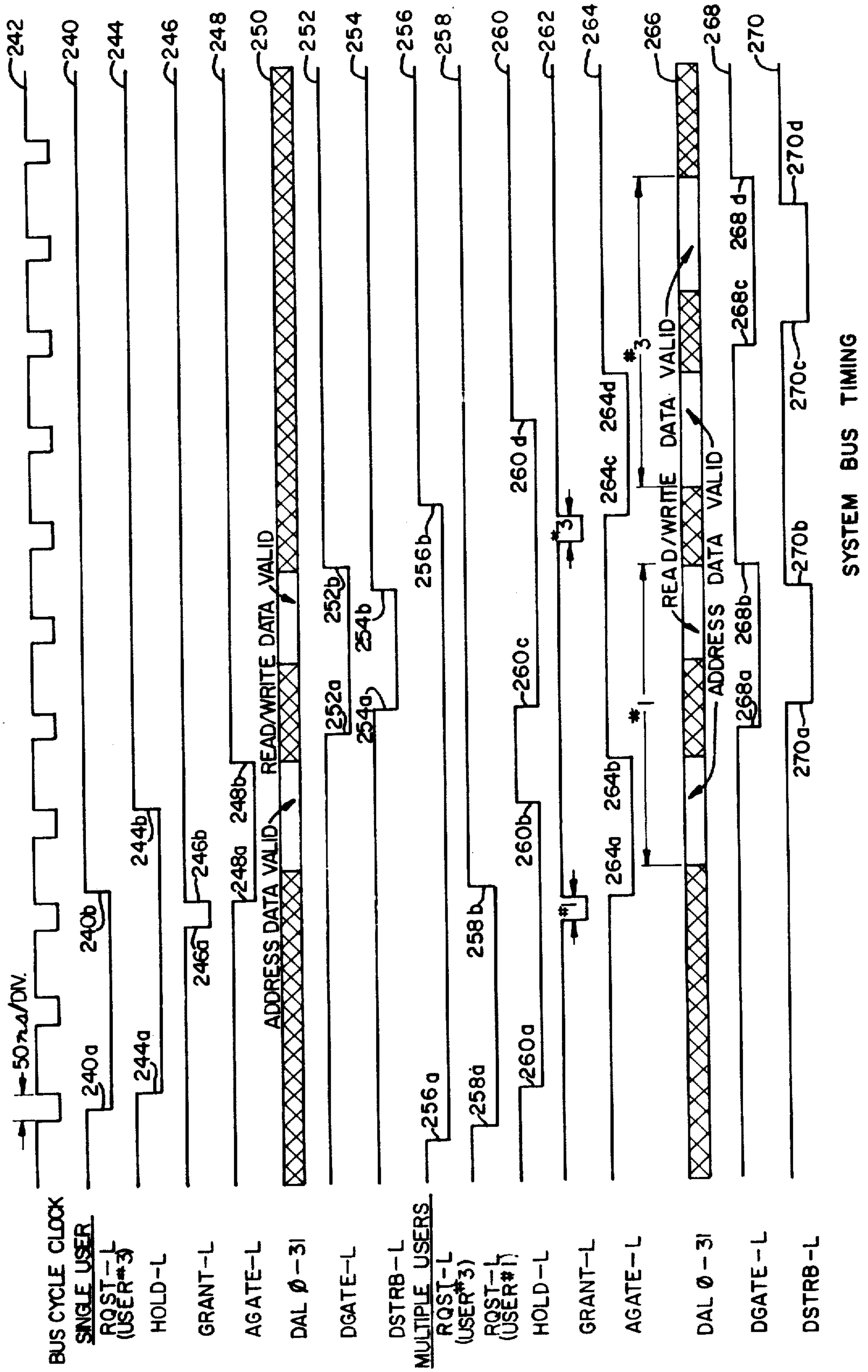
FIG. 13*b* illustrates in chart form the timing and mode control signals generated by the arbitration network.

For the case where a single user such as user #3, wishes to gain control over system bus 25 the operational sequence would be as follows. Referring to FIGS. 13*a*, *b*, *c* and *d*, user #3 generates high level signal (internal request) applying it to the input of AND gate 288 of priority circuit 55, FIGS. 13*c* and 17. This input causes the output of gate 288 to become high. This signal clocks FF 290 and causes its Q output 294 to become high and its $\bar{Q}$ output 286 to become low. The high level of Q output 294 causes the output of NOR gate 282 to become low, thereby inhibiting all lower priority users (in this case #4, #5, and #6). Q output 294 is inverted by buffer gate 292. The output of gate 292 then activates RQST-L line 57, as shown in FIG. 13*b*, timing 240. Concurrently, $\bar{Q}$ output 286 enables OR gate 284. However, the output of OR gate 284 is not activated by this enable.

Figure 13C:
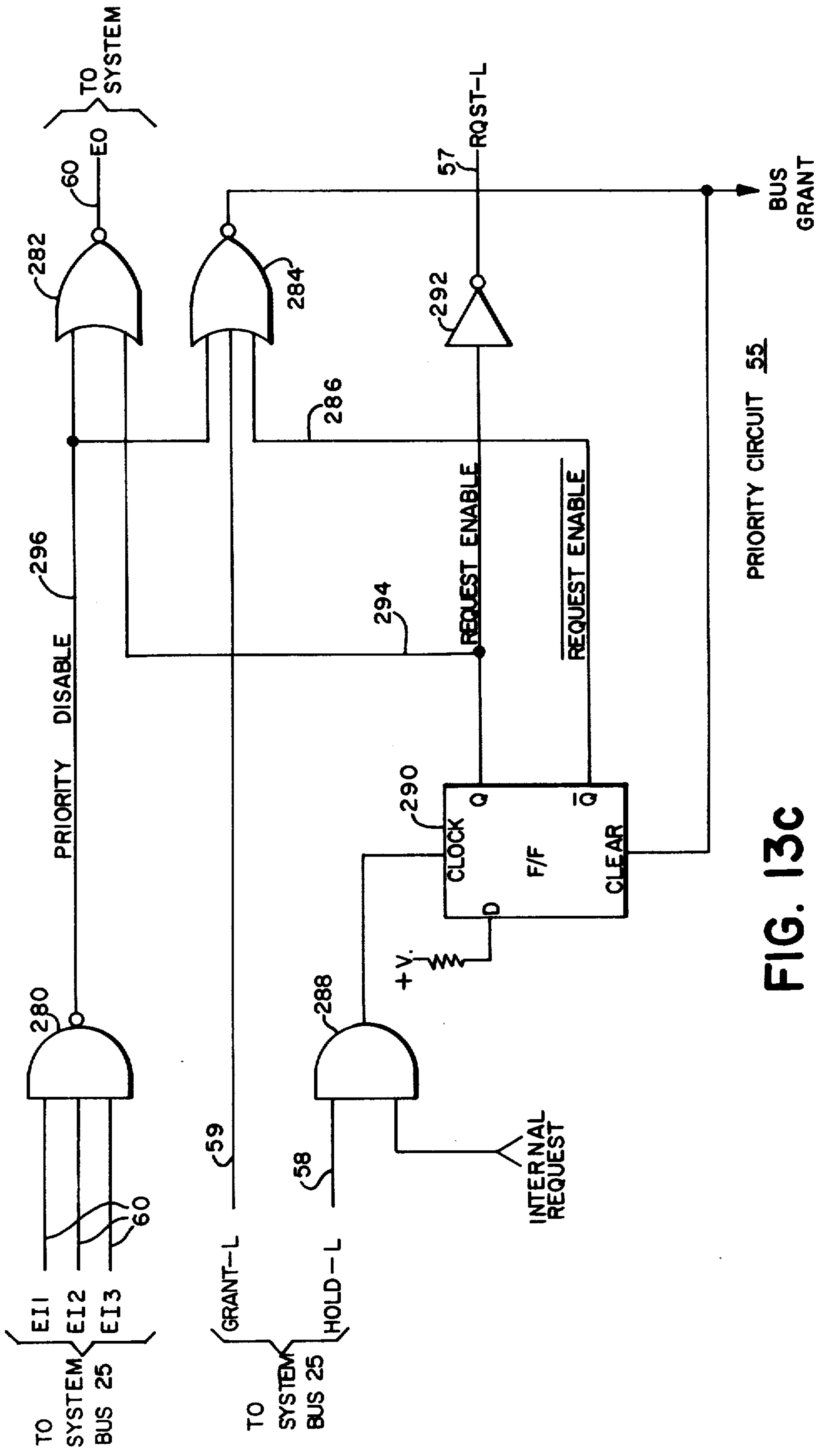
FIG. 13*c* illustrates in block diagram form the priority circuit.
Figure 13D:
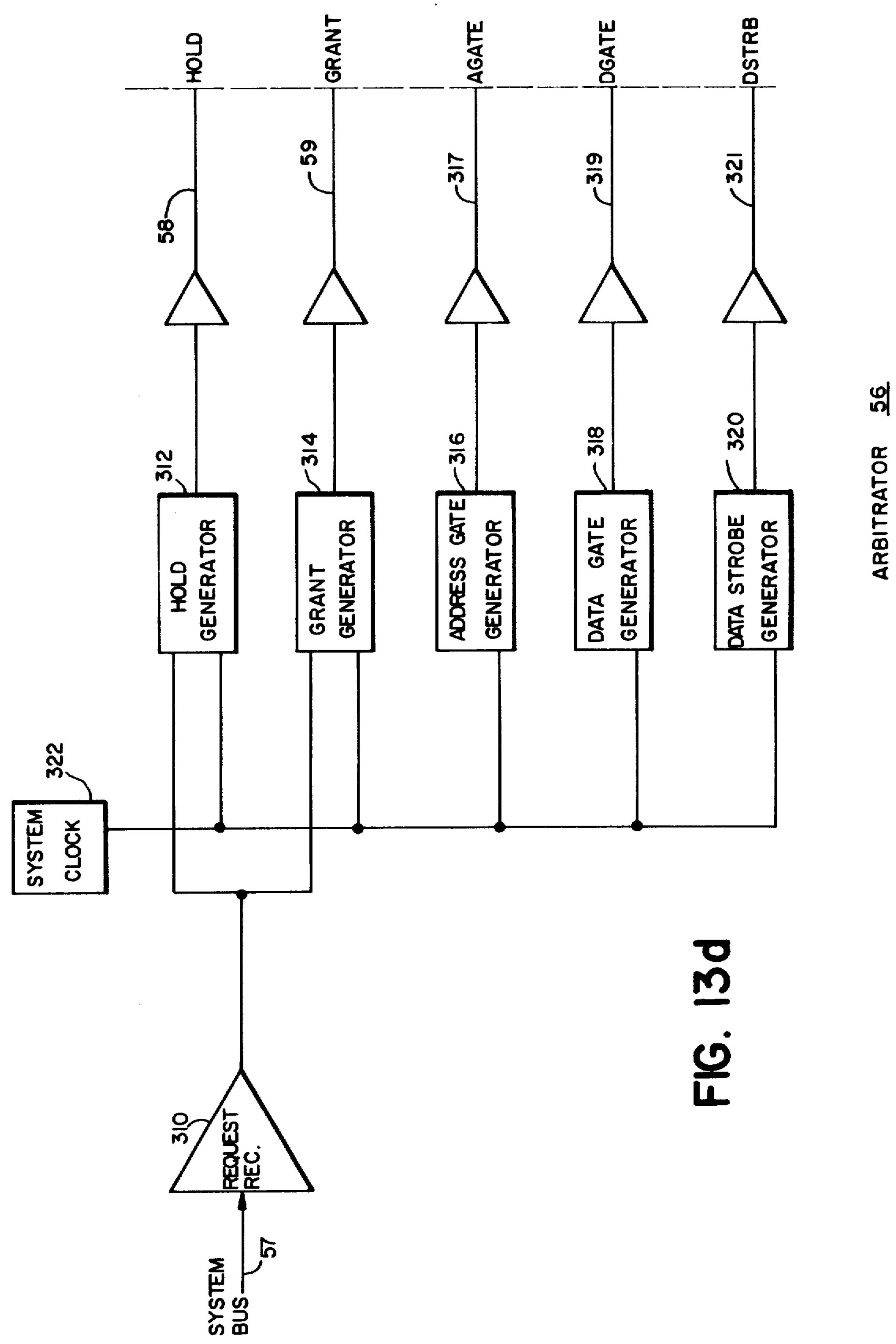
FIG. 13*d* illustrates in block diagram form the arbitration "request" receiver.

When the arbitrators request receiver 310, shown in FIG. 13*d*, detects a request on RQST-L line 57, hold generator 312 issues hold signal 244 on HOLD-L line 58 within 50 nanoseconds. This hold signal inhibits AND gate 288 thereby preventing further requests. The arbitrator's grant generator 314 then activates GRANT-L line 59 350 nanoseconds later, as shown by FIG. 13*b*, timing 246. Referring to FIG. 13*c*, since request enable 286 is at a low level and the priority disable is also at a low level (indicating that a higher priority user has not requested bus access), grant signal 246 causes the output of OR gate 284 to become low. This low level indicates to user #3 that it has been granted control of system bus 25; it also resets FF 290, which in turn deactivates the outputs of gates 282, 284, and 292.

The arbitration's grant generator 314 sets the pulse width of grant signal 246 to 50 nanoseconds. The trailing edge of this signal triggers address gate generator 316. Once triggered, generator 316 issues agate signal 248 on AGATE-L signal line 317. Generator 316 sets the pulse width of agate signal 248 to 300 nanoseconds. At this time, the bus master, user #3, issues an address word onto system bus 25. This address word shown as address word 72 in FIG. 3, must be valid within 120 nanoseconds from the leading edge of grant signal 246 and must remain valid until the trailing edge of agate signal 248.

Fifty nanoseconds after the trailing edge of agate signal 248, the data gate generator outputs dgate signal 252 on DGATE signal line 319 having a pulse duration of 350 nanoseconds. If the bus master indicates by way of a previous address word that a "write data" operation is to occur, the master places data word 82, shown in FIG. 4, on system bus 25 at this time. The "write data word" must be valid within 120 nanoseconds of the dgate signal leading edge, and must remain valid until the trailing edge of dgate signal 252.

Within 50 nanoseconds of the leading edge of dgate signal 252, data strobe generator 320 activates DSTRB-L signal line 321 for 250 nanoseconds. If the previous address word indicated a read cycle, the appropriate processor (master or slave) reads the data on system bus 25 at this time. Read data must be valid 50 nanoseconds prior to the trailing edge of DSTRB signal 254.

This concludes one system bus cycle and user #3 relinquishes control of system bus 25.

When bus access requests 254 and 256 are concurrently generated by user #3 and user #1, arbitration request receiver 310 activates generator 312. Hold signal 260 is generated to inhibit further bus requests and, 350 nanoseconds after its leading edge, grant 262 is issued on GRANT-L 59. The grant is accepted by the highest priority user. The priority is determined by the user's position in arbitration network 61 and the logic state of gates 280 and 282 in each user's priority logic 55.

In this example, request enable 294 of user #1 becomes high causing the output of NOR 282 to go to a low level. It will be noted that EO signal 60 is wired to the EI inputs of three lower priority users (users #2, #3, #4). A low on EI line causes the output of NAND gate 280 in each users' priority circuit 55 to become high. The high level on priority disable line 296 inhibits OR gate 284 from accepting grant signals and causes NOR gate 282 to issue a low level on its EO output line 60. This EO is then wired to users of even lower priority, inhibiting them from accepting the previously mentioned grant signal 262. Therefore, OR gate 284 of user #1 is activated by grant signal 262, and user #1 assume bus mastership. All subsequent timing is identical to the single used operation.

During user #1 bus operation, the RQST-L signal line of user #3 is still at a low level as shown in FIG. **13*b*. When the user #1 bus cycle is completed, arbitrator's request receiver 310 accepts the user #3 request and issues a hold 260 and grant 262, as previously described for user #1. If user #3 is the highest priority requested, its OR gate 284 accepts the grant and assumes bus mastership. At the end of the user #3 bus cycle arbitrator 56** inhibits its outputs until a bus request is made.

V. Instruction Processor/Input-Output Processor 28

Figure 5:
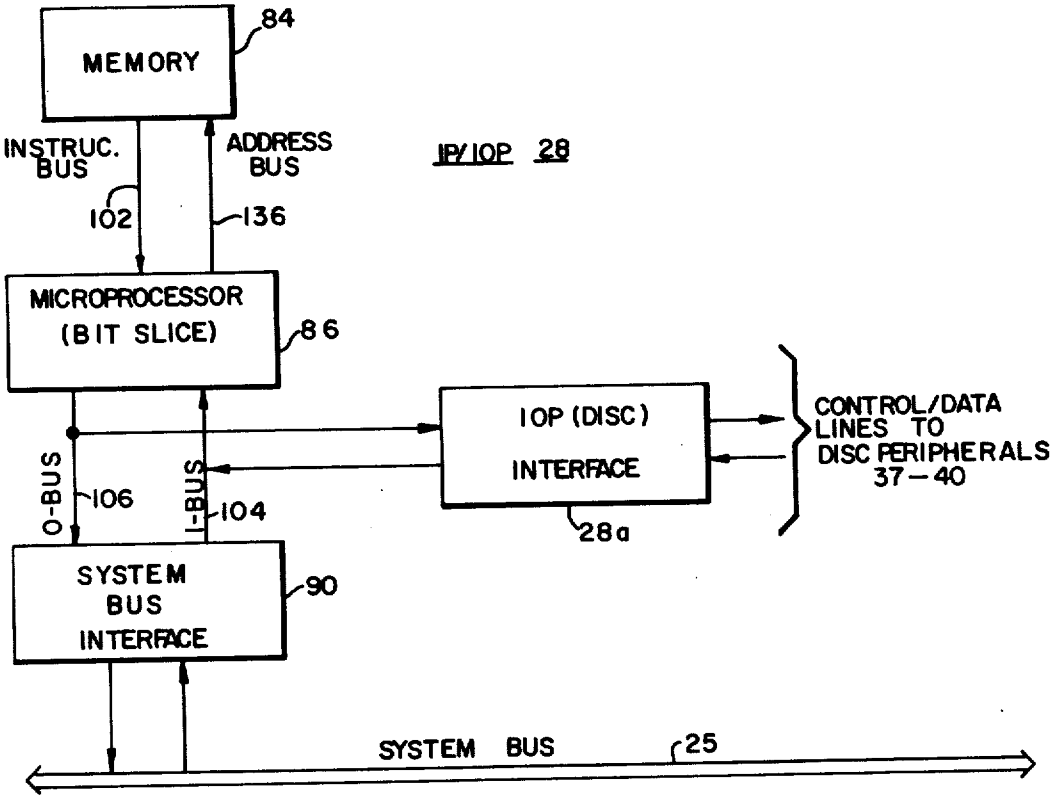
FIG. 5 illustrates in block diagram form an instruction processor/input-output processor comprising memory, IOP interface, system bus interface and a bit slice microprocessor as its control element.

IP/IOP 28, shown in FIG. 5, utilizes bit slice microprocessor 86 as its control element. Microprocessor 86 may be programmed so that FIG. 5 operates as an IP 27 in the unshared mode or an IP/IOP 28 in the shared mode. In addition, microprocessor 86 may be programmed so that FIG. 5 operates only as an IOP (disc) in the unshared mode. In the unshared mode system bus interface 90 recognizes the appropriate system bus address cycle for either an IP or IOP. In the shared mode system bus interface 90 recognizes bus cycles for both an IP and an IOP. It will be understood that the configuration (shared or unshared) is determined by user programmable circuit board links, and the processor's microcode.

Since IP/IOP 28 includes all of the elements of IP 27—the difference only being the microcode—only IP/IOP 28 will be described in detail. As shown in FIG. 5, IP/IOP 28 comprises microprocessor 86, memory 84, system bus interface 90 and IOP (disc) interface **28*a***. The following is a detailed description of each.

A. SYSTEM BUS INTERFACE 90

Figure 6:
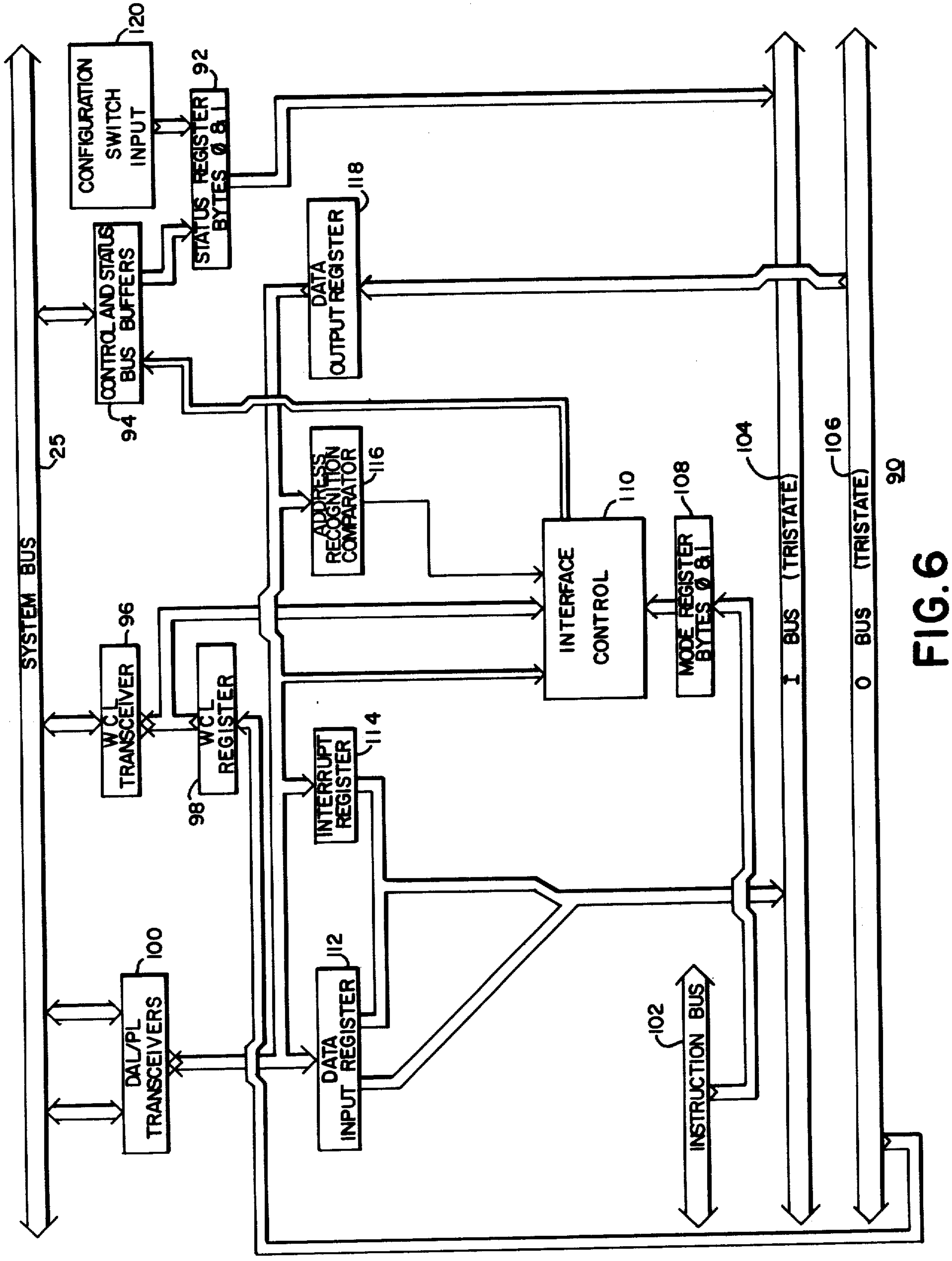
FIG. 6 illustrates in block diagram form the system bus interface, as shown in FIG. 5, comprising a data input register, a data interrupt register and a data output register.

Interface 90 is shown in detail in FIG. 6 and comprises data input register (DIR) 112, interrupt register (IR) 114, data output register (DOR) 118, address recognition comparator 116, status register 92, WCL register 98, mode register 108, interface control logic 110, and data address lines/parity lines (DAL/PL) transceiver 100. These are described below.

1. Data Input Register (DIR) 112

Figure 6A:
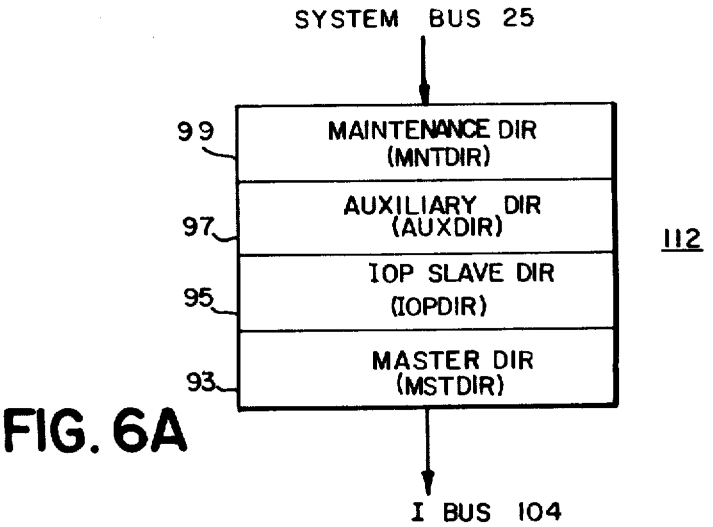
FIG. 6A illustrates in block diagram form a data input register, as shown in FIG. 6, comprising four thirty-two bit registers.

THE DIR 112 is a write only register with respect to system bus 25 and a read only register with respect to bit slice microprocessor I bus 104. DIR 112 comprises four thirty-two bit registers, as illustrated in FIG. 6A. They are master DIR 93, IOP slave DIR 95, auxiliary DIR 97, and maintenance DIR 99. Master DIR 93 is used for master system bus read cycles when microprocessor 86 is in the bus master mode. During this cycle DIR 112 cannot be written to by another bus master. IOP slave DIR 95 is used during system bus cycles in which microprocessor 86 acts as a system bus slave. When available, IOP slave DIR 95 accepts a slave system bus write cycle. Auxiliary DIR 97 is used in the slave system bus mode to accept solicited responses by microprocessor 86, and channel available interrupt requests. Finally, maintenance DIR 99 is used in the slave mode to accept maintenance messages from other system bus members.

2. DAL/PL Transceiver 100

DAL/PL transceiver 100 operates as a system bus receiver or a system bus transmitter. When operating as a receiver, DAL/PL transceiver 100 routes data from system bus 25 to DIR 112, IR 114, address recognition logic 118, and interface control logic 110. When operating as a transmitter, DAL/PL transceiver 100 routes data from DOR 118 to system bus 25.

3. Interrupt Register (IR) 114

Figure 6C:
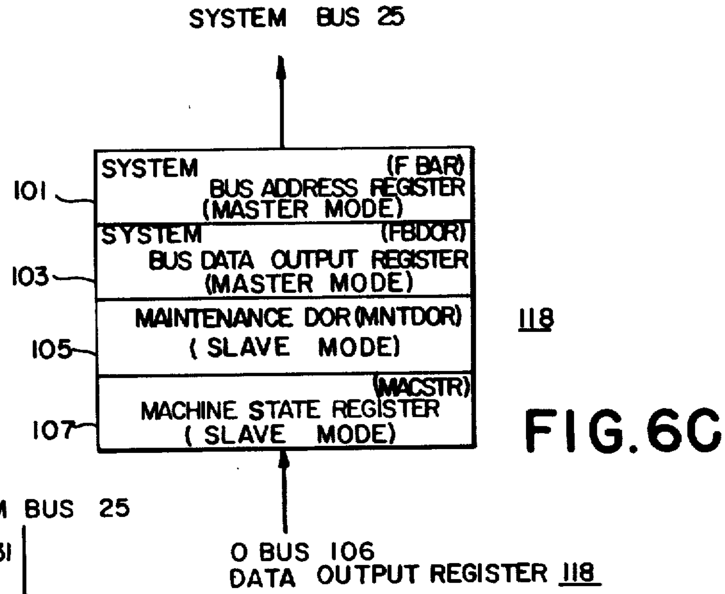
FIG. 6C illustrates in block diagram form a data output register as shown in FIG. 6.
Figure 6B:
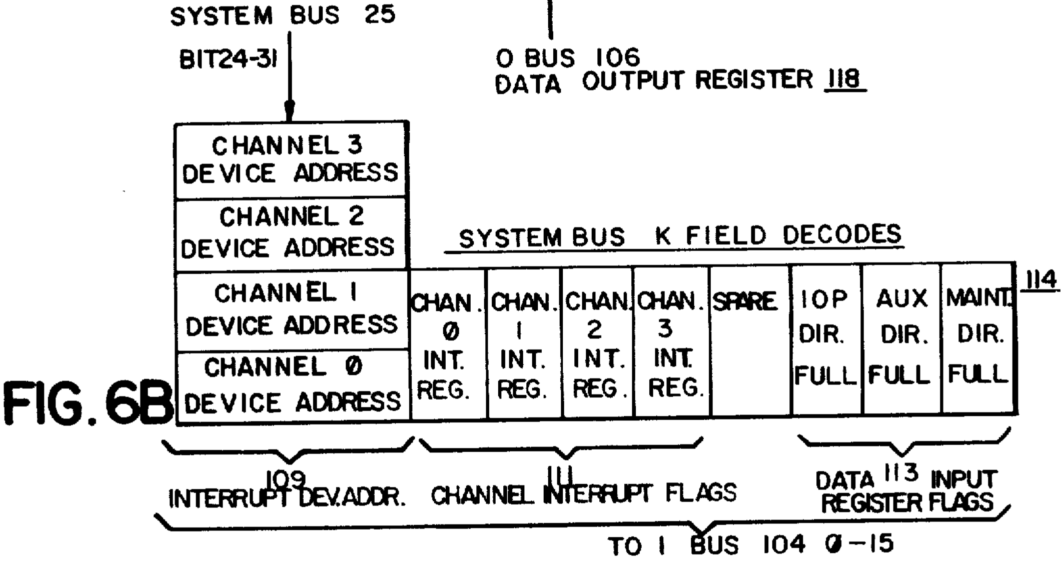
FIG. 6B illustrates in block diagram form a data interrupt register as shown in FIG. 6.

Interrupt register 114, illustrated in FIGS. 6 and 6B, contains two sets of flags and a four-word by eight-bit register file that accomplishes three functions. The first set, four flags 111, emulates IOP channels 0 through 3. The second set, three flags 113, indicates that the three DIR registers (IOP slave DIR 95, auxiliary DIR 97, maintenance DIR 99) are full. Lastly, the four-word by eight-bit register file 109 stores the interrupt device addresses.

4. Data Output Registers (DOR) 118

DOR 118 is a read only register with respect to system bus 25 and a write only register with respect to bit slice microprocessor O-bus 106. Four thirty-two bit registers comprise the DOR as illustrated in FIG. 6C. They are system bus address register 101, maintenance DOR 105, system bus DOR 103, and machine state register 107. System bus address register 101 provides, during master system bus cycles, slave address information during the AGATE system bus time. Maintenance DOR 105 provides, during slave system bus cycles, maintenance information to the bus master. System bus DOR 103 provides, during master system bus write cycles, data to other system bus members. Finally, machine state register 107 provides, during slave system bus cycles, status data to the system bus master.

5. Address Recognition Comparator 116

When acting as a slave, IP/IOP 28 utilizes comparator logic 116 to monitor bits DAL 4 through DAL 11 of system bus 25 during the AGATE system bus cycle time. Logic 116 compares system bus bits DAL 4 through DAL 11 with microprocessor bits CFS 0 through CFS 7 (CFS 0 through CFS 7 bits are set by way of microprocessor board switches) and when match occurs a signal is outputted to microprocessor 86 indicating that the instruction on system bus 25 is addressed to IP/IOP 28. A functional description of DAL 4 through DAL 11 has previously been described with respect to FIG. 3. DAL 4 and 5 denote whether the message is addressed to IP/IOP 28. DAL 6 and 7 indicate the emulated channel address. And, DAL 8 through DAL 11 contain the emulated sub-channel/device address.

6. Status Register 92

Status register 92 provides four bytes of various status information to microprocessor 86 by way of I-bus 104. System bus interface 90 utilizes two bytes of status register 92, bytes 0 and 1. Byte 0 (CFS byte) contains 8 bits of status from the user configuration switch inputs 120 (where CFS 0=shared/unshared mode, CFS 1-IP/IOP (this bit is ignored in the shared mode) CFS 2 through CFS 5=spare, and CFS 6 through CFS 7=IP number-/IOP channel address (M-field 66)). These 8 bits are also used by address recognition logic 116 to identify system bus address cycles.

Byte 1 (FBS byte) contains 8 bits of system bus status that is stored in status register 92 when a system bus master cycle is in progress. FBS bit 0 is address acknowledge; FBS bit 1 through FBS bit 5 are slave busy, system bus error, memory protect violation, memory corrected error, and memory uncorrected error respectively; FBS bit 6 is a spare; and FBS bit 7 is an internal status bit that functions as a system bus overrun detector. This data is routed to status register 92 from system bus 25 by way of control and status bus buffer 94.

7. WCL Register 98

Prior to a system bus write cycle and after DOR 118 is loaded, microprocessor O-bus 106 loads write control bits (WCL 0 through WCL 3) into WCL holding register 98. During the write cycle, WCL holding register 98 presents the same write control bits to system bus 25 by way of WCL transceiver 96. On the other hand, during a system read cycle, if address recognition logic 116 detects the address of IP/IOP 28, the write control data bits are presented to bus interface control logic 110 by system bus 25 by way of WCL transceiver 96.

8. Mode Register 108

Microprocessor 86 controls system bus interface 90 by utilizing an eight bit field (N-field) on its micro instruction bus 102. The N-field bits act to set or reset control bits in byte 0 and byte 1 of mode register 108.

TABLE 1

Mode Register (MR) 108 Bit Definition

| Bit # | Function |
|---|---|
| MR 0 | System Bus 25 R/W |
| MR 1 | DOR 118 Write Address Select |
| MR 2 | I/O Mode |
| MR 3 | Interface (I/F) Transceiver Disable |
| MR 4 | I/F Error Enable |
| MR 5 | Spare |
| MR 6 | Spare |
| MR 7 | Spare |
| MR 8 | Channel 0 Interrupt Register Reset |
| MR 9 | Channel 1 Interrupt Register Reset |
| MR A | Channel 2 Interrupt Register Reset |
| MR B | Channel 3 Interrupt Register Reset |
| MR C | DIR Reset Bit 0 |
| MR D | DIR Reset Bit 1 |
| MR E | DIR Read Address Bit 0 |
| MR F | DIR Read Address Bit 1 |

These control bits defined in Table 1 are used by interface control 110 to generate the logic signals required by system bus interface 90. As shown in Table I, MR 0 defines a master read cycle or a master write cycle when such cycle is initiated by microprocessor 86. MR 1 selects between the FBAR 101/FBDOR 103 register pair of the MNTDOR 105/MACSTR 107 register pair in DOR 118. MR 2 defines whether microprocessor 86 is currently operating as an IP/IOP 28 or an IP 27. MR 3 enables/disables all system bus interface transceivers. MR 4 enables or clears the system bus overrun detection logic. MR 5 through MR 7 are spare bit locations. MR 8 through MR B reset channel interrupt request flags 111 stored in interrupt register 114. MRC and MRD provide one of four resets to DIR flags 113 stored in interrupt register 114. Finally, MRE and MRF provide the two address bits necessary to read system bus data input register 93, 95, 97, and 99; and interrupt device address register 109.

9. Interface Control Logic 110

Interface control 110 generates all the timing and control signals required by system bus interface 90. Interface control logic 110, shown in FIG. 6, accepts command signals from mode register 108, control and status bus buffers 94, WCL transceiver 96, DAL/PL transceivers 100 and address recognition comparator 116. It generates all the control signals required by interface 90 for accepting data from system bus 25, transmitting data to I-bus 104, accepting data from O-bus 106, and transmitting data to system bus 25.

When interface control logic 110 receives a match signal from address recognition comparator 116, a sequence begins in which data from bus 25 is accepted. Interface logic 110 enables a K-field decoder to determine whether the data is to be stored in DIR 112 or IR 114. Interface logic 110 monitors IR flags 113 (FIG. 6B) to determine if the requested register is available. If not available, interface 110 generates a slave busy (SBSY) and transmits it into system bus 25 by way of control and status bus buffers 94. If the requested register is available, interface logic 110 generates the enables and the addresses required to load the register and also transmits an acknowledge (AACK) to system bus 25.

Microprocessor 89, described later, requests data from interface logic 110 by activating the appropriate bits in mode register 108. When these bit are detected by interface logic 110, the required register enable lines are activated so that data in DIR 112, IR 114, and status register 92 can be applied to I-bus 104. When microprocessor 86 sets mode register bits indicating data is to be written into DOR 108 or WCL register 98, interface logic 110 generates the appropriate DOR address and enables. When instructed by microprocessor 86 to transmit data onto system bus 25, interface logic 110 generates a bus request (RQST-L). When a grant (GRANT-L) is received, interface logic 110 monitors the bus control lines and, at the appropriate AGATE and DGATE periods, sets DAL/PL 100 and WCL 96 into the transmit mode, and then transfers the contents of WCL register 98 and DOR 118 to system bus 25.

Figure 18A:
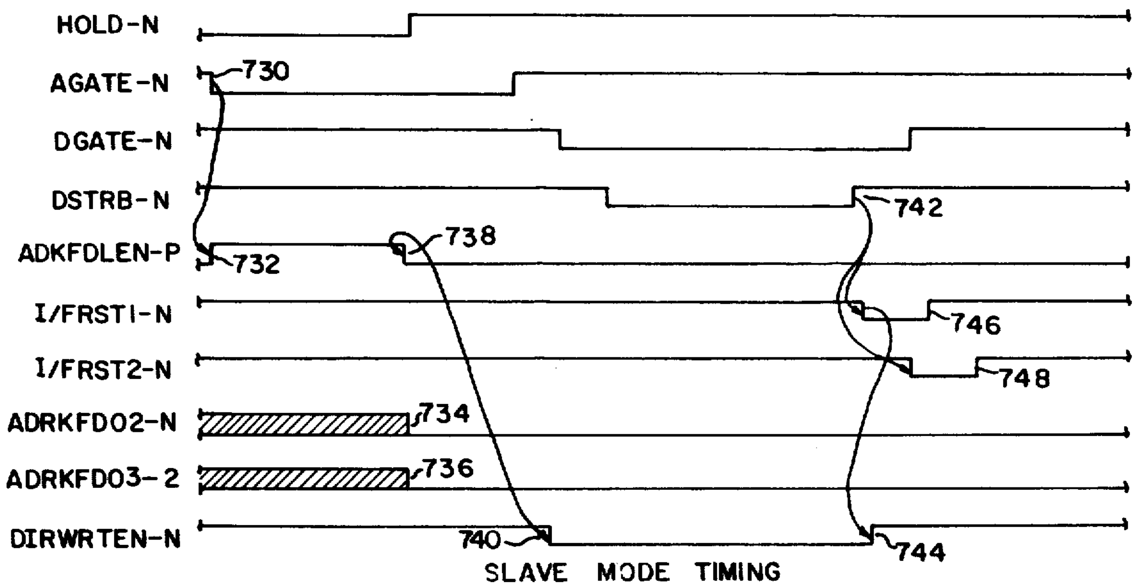
FIGS. 18*a* and 18*b* illustrate in chart form timing control signals generated by interface control during a bus cycle.
Figure 17:
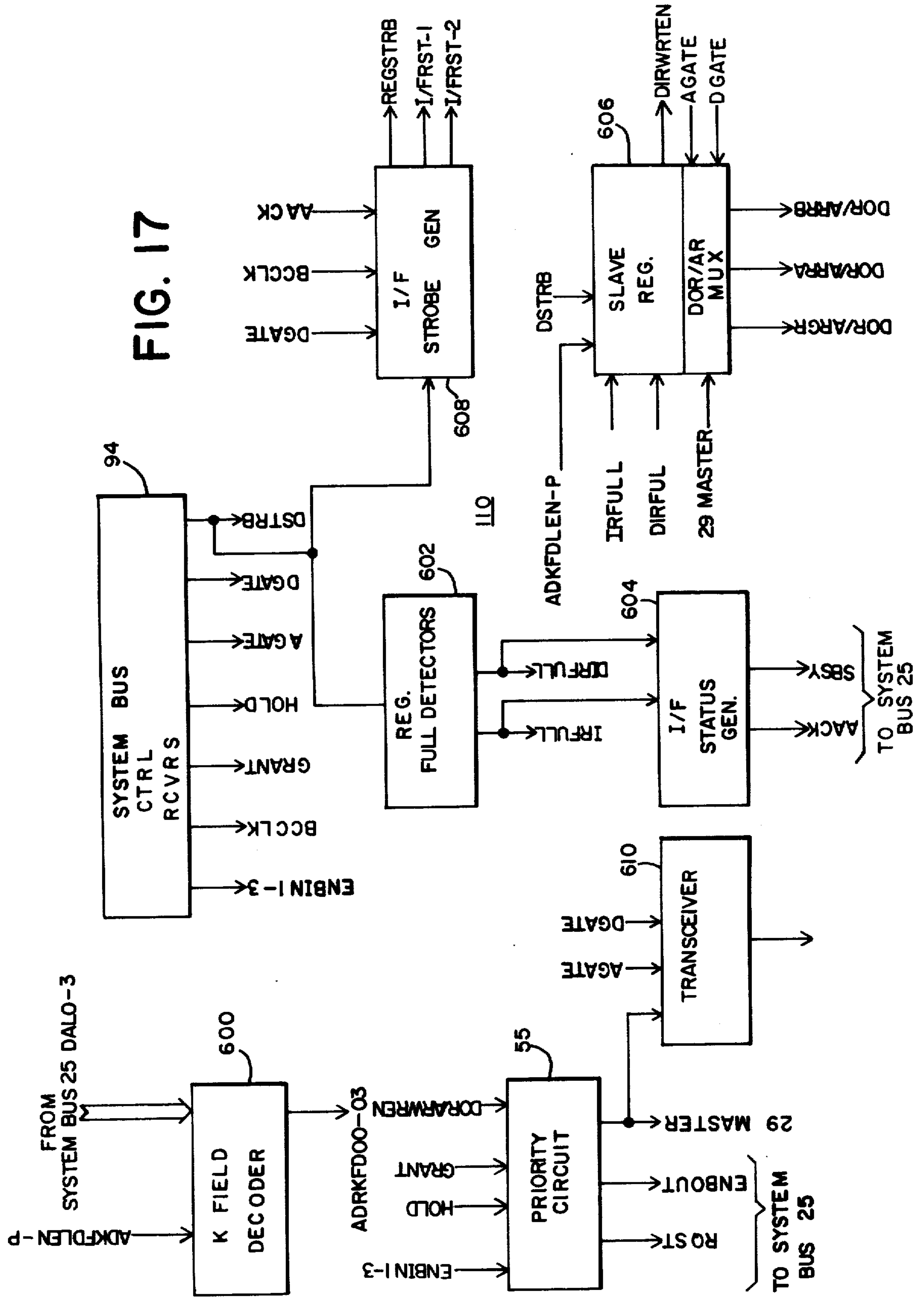
FIG. 17 illustrates in block diagram form sequences followed during a bus cycle.
Figure 18B:
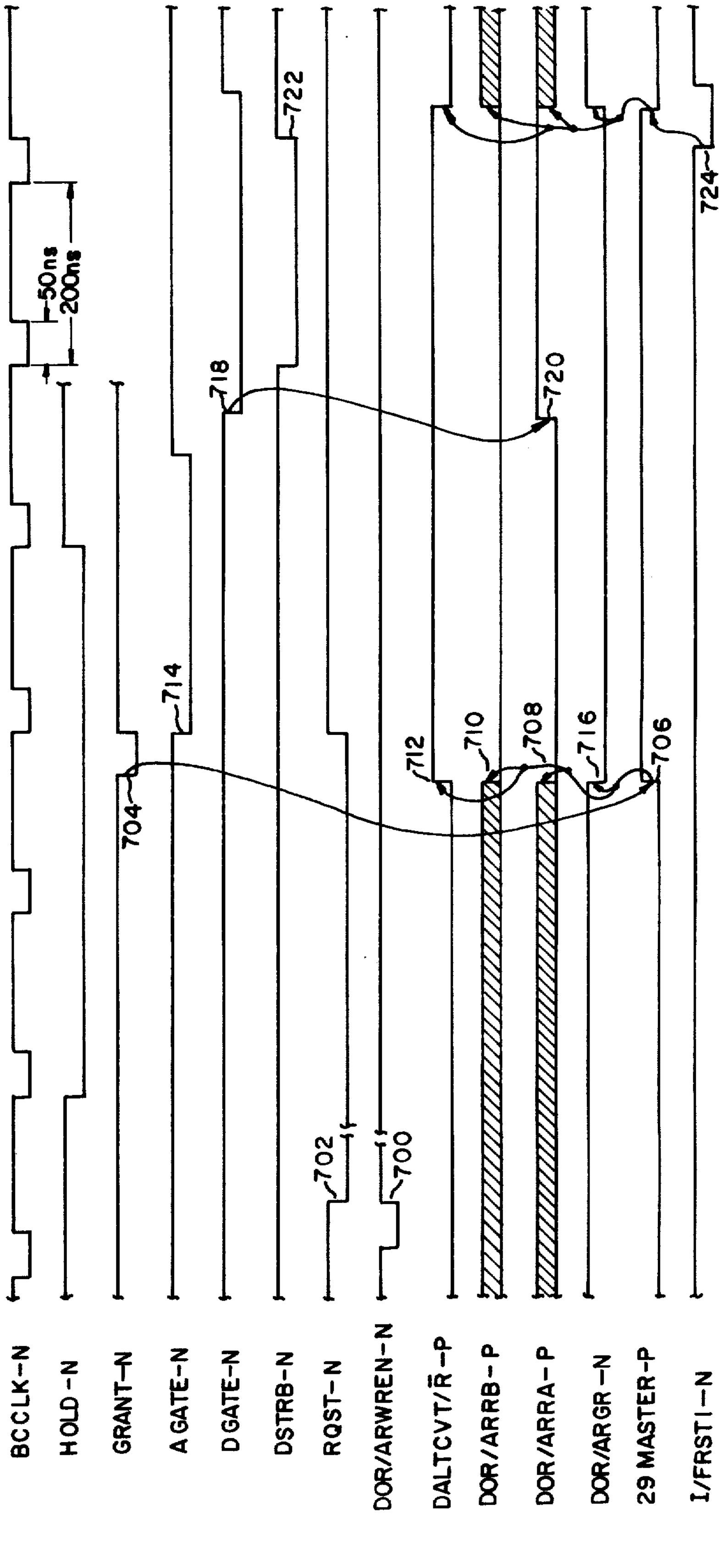

The timing control signals generated by interface control 110 during a master and slave bus cycle are illustrated in FIGS. 17, 18*a* and 18*b*.

When system bus interface 90, FIG. 6, is operating in the master bus mode, mode register 108 transmits DOR-/ARWREN-N 700 to priority circuit 55. As previously described in system bus timing IV, priority circuit 55 issues a RQST-N 702 onto system bus 25. When arbitrator 56, FIG. 13*a*, issues a GRANT-N 704, priority circuit 55 reacts by generating 29 MASTER-P 706. This signal is provided to DOR/AR MUX 606 which generates the address of DOR register 118, FIG. 6*c*, to be enabled. These DOR address lines are DOR/ARRA-P 708 and DOR/ARRB-P 710 and are coupled to DOR register 118 control lines. In this example, DOR/ARRA-P 708 and DOR/ARRB-P 710 are coupled to FBAR 101 in DOR 118.

Coincident with this action, MASTER-P 29 is also coupled to transceiver 610 which generates DALCVT/R 712. This signal is fed to DAL/PC transceivers 100 and causes them to enter the bus transmit mode. When AGATE 714 is detected by DOR/AR MUX 606, DOR/ARGR-N 716 is generated. This signal, DOR/ARGR-N 716, is coupled to DOR 118 and causes the DOR outputs to become active. The contents of FBAR 101 of DOR 118 are then placed onto system bus 25 during the AGATE bus period. The contents of FBAR 101 are address format data word 72 and have been previously described.

When DGATE 718 is detected by DOR/AR MUX 606, DOR 118 address lines change (DOR/ARRA-P 720) and the new address points to FBDOR 103 of DOR 118. In this case, FBDOR 103 contains a data format word 82. Since the DOR/ARGR and DALTCVT/R are still active, the contents of FBDOR 103 are placed on system bus 25. At DSTRB 722 bus time, I/F strobe generator 608 outputs a I/FRST 1-N 724 which resets interface control 110. This action marks the end of the master bus cycle.

When system bus interface 90, FIG. 6, is operating in a slave bus mode, DALTCVT/R (transceiver 610) control line keeps DAL/PC transceivers 100 in the receive mode. This allows address recognition comparator 116 to constantly monitor system bus 25. During AGATE 730, upon comparator 116 recognizing its address in the instruction currently on system bus 25, it issues a match signal (ADKFDLEN-P 732) to K field decoder 600. This causes decoder 600 to decode the K field and activate its DIR 112 and IR 114 address lines (ADRKFD-N 734). If register full detector 602 indicates, by way of the IRFULL or DIRFUL lines, a full DIR 112 of full IR 114, I/F status generator 604 outputs a busy (SBSY) signal to system bus 25. If, however, interface 90 can accept the instruction, generator 604 issues an acknowledge (AACK) on system bus 25. In this example, the ADRKFD 02-N 734 and ADRKFD 03-N 736 address lines are used to address IOPDIR 97 in DIR 112. The trailing edge of ADKFDLEN-P 738 causes slave register 606 to output DIRWRTEN 740 to DIR 112. DIRWRTEN 740 is a DIR write enable which causes the contents of IOPDIR 97 to follow the system bus DAL 0 through DAL 31. On the trailing edge of DSTRB-N 742, slave register 606 deactivates DIRWRTEN-N 744. This causes IOPDIR 97 to store the data on system bus 25 at the time of deactivation. This stored data is a data format word 82. I/F strobe generator 608 also detects DSTRB 742 and issues I/FRST1 746 and I/FRST2 748. These signals (I/FRST1 and 2) reset system bus interface control 110 and indicates the end of the slave bus mode.

B. IP/IOP FIELD K 62 DEFINITIONS

As previously mentioned, address format 72, shown in FIG. 3, originates from the master processor to a slave processor, instructing the latter with respect to a particular function the slave is to perform. Address format 72 contains six fields, one being field K 62. When IP/IOP 28 is acting as a slave on system bus 25, it steers and loads data in accordance with the master's instructions, said instructions having been defined in field K 62.

The following describes the operation of IP/IOP 28 as a system bus slave with regard to field K 62. Field K 62 is used by system bus interface 90 in conjunction with the write control lines shown in FIG. 2 to steer and load data. Table 2 contains a summary of field K 62 instructions used by IP/IOP 28 while operating in a slave mode.

TABLE 2

| K Field | All WCL=0 | Any WCL=1 |
|---|---|---|
| $0_{16}$ | Reserved for EDF | Reserved for EDF |
| $1_{16}$ | Spare | Spare |
| $2_{16}$ | Not Used | Enable DIR Flag Reset |
| $3_{16}$ | Not Used | Enable Int. Reg. Reset |
| $4_{16}$ | FBAR 101 | Not Used |
| $5_{16}$ | FB DOR 103 | IOP DIR 95 |
| $6_{16}$ | MNT DOR 105 | AUX DIR 97 |
| $7_{16}$ | MACSTR 107 | MNT DIR 99 |
| $8_{16}$ | Not Used | Channel 0 Int. Request 111 |
| $9_{16}$ | Not Used | Channel 1 Int. Request 111 |
| $A_{16}$ | Not Used | Channel 2 Int. Request 111 |
| $B_{16}$ | Not Used | Channel 3 Int. Request 111 |
| $C_{16}$ | Spare | Spare |
| $D_{16}$ | Toggle IOP DIR Busy Flag | |
| $E_{16}$ | Operate Mode | |

TABLE 2-continued

| K , Field | All WCL=0 | Any WCL=1 |
|---|---|---|
| $F_{16}$ | Bus Reset | |

As shown in Table 2, $0_{16}$ is reserved for use by extended debug facility (EDF) 28c to communicate with the system bus. When the field is $2_{16}$ and any WCL is active, flags 113 in interrupt register 114 (FIG. 6B) are reset. A field of $3_{16}$ and any active WCL causes interrupt request flags 111 in interrupt register 114 to be reset. A field $4_{16}$ with all WCL's inactive causes the contents of system bus address register 101 in DOR 118 to be gated onto system bus 25. When the field is $5_{16}$ and all WCL's are inactive, the contents of system bus data output register 103 in DOR 118 is gated onto bus 25. If any WCL is active and the field is $5_{16}$ and, in addition, if the IOP DIR busy flag and IOP DIR full flag 113 located in status register 92 and interrupt register 114, respectively, are cleared, the data contained in the system bus instruction is written into IOP slave DIR register 95 of DIR 112. During a field of $6_{16}$ and with all WCL's inactive, the contents of maintenance DOR 105 in DOR 118 is gated onto system bus 25. When the K field is $6_{16}$ and AUX DIR full flag 113 in interruupt register 114 is cleared, the data contained in the current system bus instruction cycle is transferred into auxiliary DIR register 97 of DIR 112. When the field is $7_{16}$ and with all WCL's inactive, the contents of machine status register 107 in DOR 118 is gated onto system bus 25. When the field is $7_{16}$ and MNT DIR full flag 113 in interrupt register 114 is cleared, the data contained in the current system bus instruction cycle is transferred into maintenance DIR register 99 of DIR 112. If any WCL is active, and the field is $8_{16}$, a channel 0 interrupt is produced in device address register 109 of interrupt register 114. K fields $9_{16}$, $A_{16}$, and $B_{16}$ perform the same function as K field $8_{16}$ for channels 1, 2, and 3 respectively. A field of $D_{16}$ causes the IOP DIR busy flag to toggle. When equal to a logic "1", the IOP DIR busy flag protects the data in IOP DIR register 95 of DIR 112, and returns a slave busy on the system bus cycle attempting to write to the IOP DIR register. Finally, K field $E_{16}$ causes IP/IOP 28 to enter the operate mode, whereas a K field of $F_{16}$ causes the IP/IOP 28 to enter a standby mode.

C. MICROPROCESSOR (BIT-SLICE) 86

Figure 7:
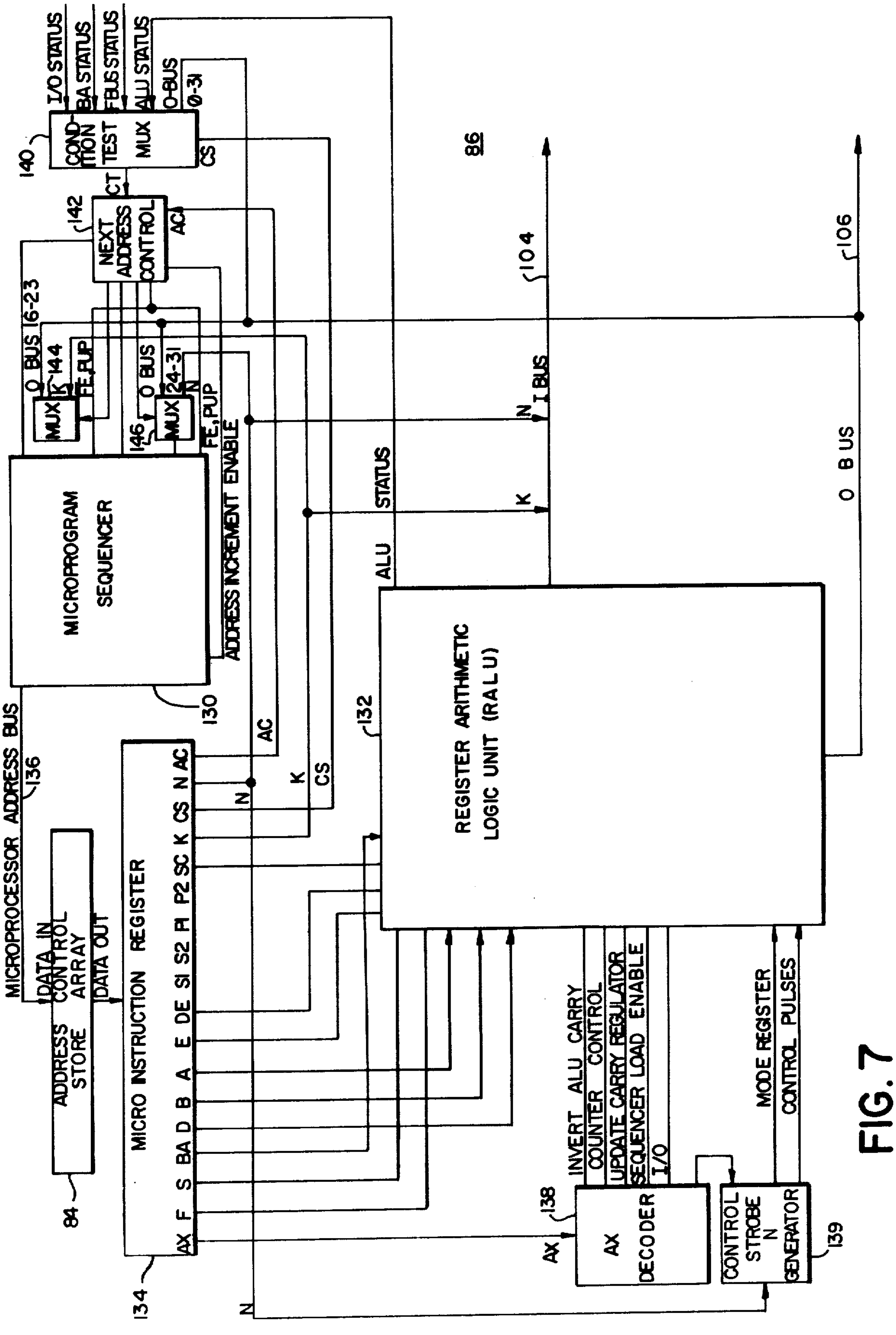
FIG. 7 illustrates in block diagram form a microprogram sequencer and a register arithmetic logic unit of the bit slice microprocessor, shown in FIG. 5, and IP-/IOP memory of the IP/IOP shown in FIG. 5.

Microprocessor 86 is based on two bipolar elements: microprogram sequencer 130 and register arithmetic logic unit (RALU) 132 shown in FIG. 7. Upon receipt of a start command, microprogram sequencer 130 generates and transmits the appropriate memory address to memory 84 by way of microprocessor address bus 136. The memory address is 16 bits wide allowing up to 64000 words of memory to be accessed. The memory responds to this address by loading the addressed data into micro-instruction register 134. This data, known as an EO word, is subdivided into 18 fields. The bit pattern of each field controls the operation of one or more logic elements that make up microprocessor 86. The control operation includes generating signals required by sequencer 130 to address the next EO word. Appendix I shows the microprocessor functions controlled by the EO word. The BA field, a one bit field, acts to modify fields A, B, D, and SC by way of byte alignment hardware 148. When field BA is a logic 0, the 4-bit A field is used as an address source for RALU 132 internal registers. When field BA is a logic 1, the A field determines which internal registers of RALU 132 are to be used as byte alignment registers. When field BA is a logic 0, the 4-bit B field specifies either a O bus 106 register selection or an internal selection in RALU 132. The B field operation is also dependent on the logical states of the S and D fields. When field BA is a logic 1, the B field is unconditionally used to specify an O bus 106 register selection in RALU 132. The 3-bit S field is used to select an internal ALU source in RALU 132. The 3-bit D field specifies the movement of ALU data within RALU 132. The two bit SC field specifies the type of bit shift or byte rotation required in RALU 132. The E and SC fields are utilized to select an internal register and byte rotation of the RALU I bus input. Internal register selection of the RALU O bus output is accomplished by the DE field in conjunction with the B or E field. The K and N fields provide an 8 or 16 bit field that can be applied to I bus 104. The 4-bit AX field, decoded by a standard 4 to 16 line demultiplexer (AX decoder 138), generates up to sixteen auxiliary control functions for the microprocessor. These control functions are summarized in Table 3.

TABLE 3

| AX Value | Function |
|---|---|
| 0 | NOP — No function is performed |
| 1 | Invert ALU Carry In |
| 2 | Increment Counter |
| 3 | Decrement Counter |
| 4 | Conditionally Increment Counter |
| 5 | Conditionally Decrement Counter |
| 6 | Update Carry Register |
| 7 | Microprogram Sequencer Register Load Enable |
| 8 | I/O |
| 9 | I/O |
| A | Spare |
| B | Spare |
| C | Spare |
| D | External Destination Byte Write [N]* |
| E | I Bus Mask [N]* |
| F | Control Strobe [N]* |

*The N field is an argument for this AX code.

The seven-bit CS field provides various test conditions for sequencer 130 to be exercised by the next address selection. These test conditions include I/O status, BA status, system bus status, ALU status and O bus bits 0 through 31 status. Each test condition's status is latched at the beginning of every EO. The CS field selection is accomplished by way of a standard multiplexer (condition test mux 140). The CS field decodes are summarized in Table 4. These test conditions reflect the results of the previous EO word. Lastly, 4-bit AC field allows the next micro-instruction address to be chosen from sixteen pairs of the next addresses. Next address control 142 decodes this AC field and then routes address control data to sequencer 130 from either condition test mux 140 or O bus 106 by way of mux's 144 and 146. The AC field decodes are summarized in Table 5.

TABLE 4

| CS Decoder | Function | CS Decode | Function |
|---|---|---|---|
| 00(40) | True | 09(49) | F Bus Check |
| 01(41) | ALU Zero | 0A(4A) | F Bus Data In Reg. Full |
| 02(42) | ALU Minus | 0B(4B) | IOP DIR Busy |
| 03(43) | ALU Overflow | 0C(4C) | Slave F Bus In Progress |
| 04(44) | ALU Carry Out | 0D(4D) | Spare |

TABLE 4-continued

| CS Decoder | Function | CS Decode | Function |
|---|---|---|---|
| 05(45) | Counter OVFL/UNDFL | 0E(4E) | Spare |
| 06(46) | Initial Transfer Valid | 0F(4F) | Spare |
| 07(47) | Extra Transfer Reg. | 10-1F(50-5F) | I/O |
| 08(48) | Master System Bus Cycle in Progress | 20-3F(60-7F) | RALU Y0-Y31 |

Note:
Numbers in parenthesis are inverted Condition Tests.

TABLE 5

| AC Field | Condition Test True | Condition Test False |
|---|---|---|
| 0 | Jump K,N | Micro Program Counter (MPC) |
| 1 | Jump K,N | Jump Sequencer Register |
| 2 | Jump K,N, Push | MPC |
| 3 | Jump K,N, Push | Jump Sequencer Register, Push |
| 4 | Branch, Same Page, N | MPC |
| 5 | Branch, Same Page, N, Push | MPC |
| 6 | Branch, Same Page, N4, Y4 | MPC |
| 7 | Branch, Same Page, N6, M, Z | MPC |
| 8 | Jump Y16 | MPC |
| 9 | Jump Sequencer Register, Push | MPC |
| A | Jump Sequencer Register | MPC |
| B | Repeat | MPC |
| C | Return | MPC |
| D | Return, POP | MPC |
| E | Return | MPC, POP |
| F | Spare | Spare |

D. MEMORY 84

IP/IOP memory 84, OF IP/IOP 28 (FIG. 5) is illustrated in FIG. 7, and is organized with 64K words, each word having 64 bits. Memory 84 accepts a 16 bit address from sequencer 130 by way of microprocessor address bus 136 and outputs the 64 bits of data stored at that addressed location to micro-instruction register 134 by way of microprocessor instruction bus 102. Memory 84 uses programmable read only memories (PROM) or writable control stores (WCS). Using the PROM memory, the microcode is stored in the PROM and cannot be modified by the user. Using WCS, the microcode is loaded to IP/IOP 28 by SCP 26 during the power up sequence described previously.

E. IOP (DISC) INTERFACE 28a

As previously described IP/IOP 28 is a processor that provides a communications path between system bus 25 and high speed disc storage drives 37-40, FIG. 1. This processor operates as both a system bus channel emulator and a disc device controller. As a channel emulator, the IP/IOP 28 receives and generates all the channel messages at system bus interface 90 (FIG. 5) required to simulate the channel architecture. As a disc device controller, IP/IOP 28 generates and receives all the control signals required to support disc drives 37-40. The control and status signals generated by the IP/IOP 28 device controller emulate (through the use of microcode) the operation of an IBM 3830 storage controller. This operation is described in IBM document #GA26-1592-5 incorporated herein by reference.

As mentioned earlier, IP/IOP 28 is a shared configuration whereby the IOP shares resources with the IP. The resources shared are microprocessor 86, memory 84, and bus interface 90, all shown in FIG. 5. Microprocessor 86 is time shared between the IOP and IP based on the microcode program stored in memory 84. Bus interface 90 accepts and issues messages for both the IP and IOP, when communicating with system bus 25. Microprocessor 86, memory 84 and bus interface 90 have already been described.

Figure 5A:
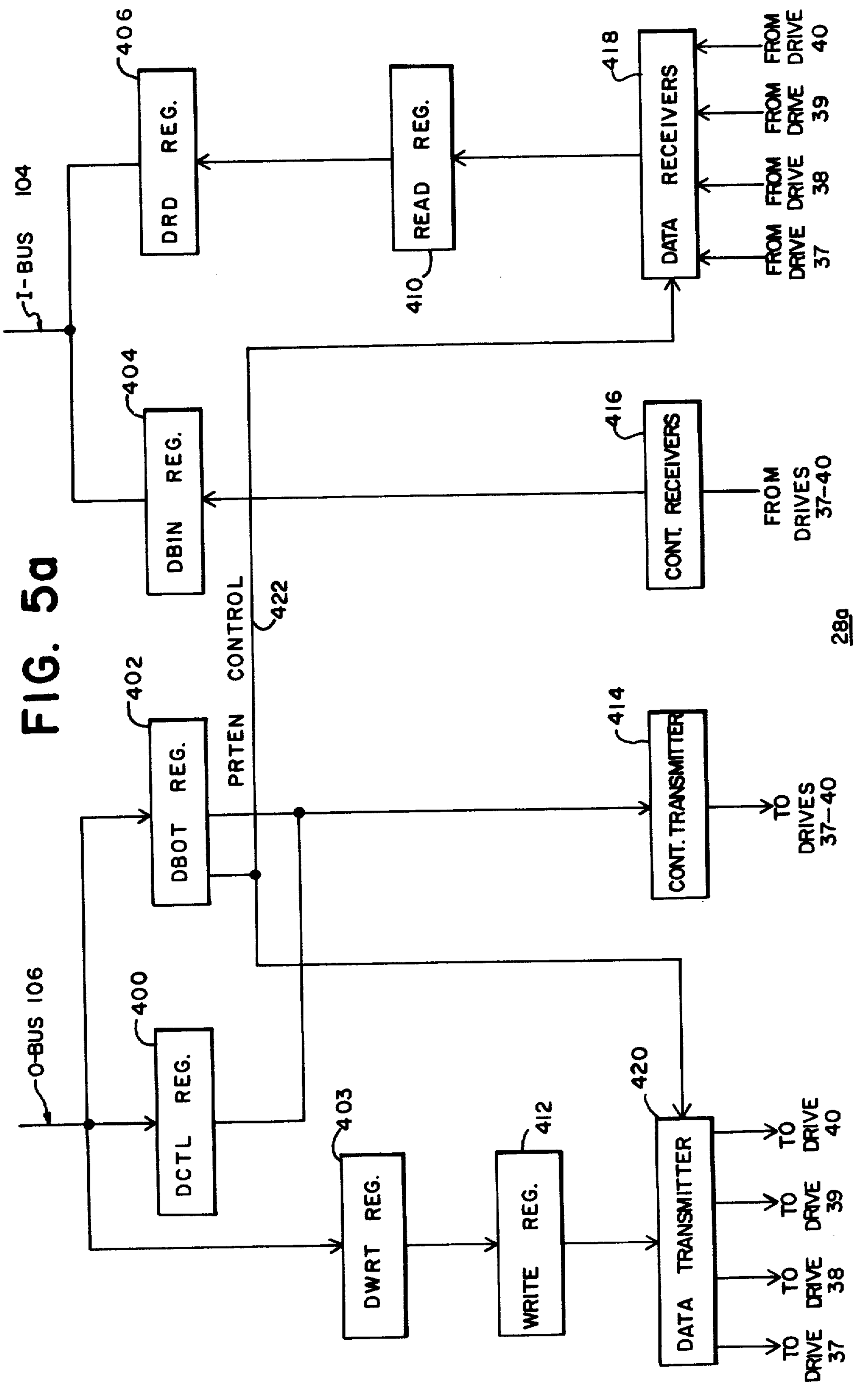
FIG. 5A illustrates in block diagram form the disc drive interface utilized by the IOP shown in FIG. 1.

The IOP utilizes interface 28a as an electrical interface to the disc drives. This interface is utilized only by the IOP; it is not used by the IP. Interface 28a is shown in FIG. 5a and its operation will now be described.

Control signals from the IOP microde, stored in memory 84, are sent by way of O-bus 106 and stored in DCTL register 400 and DBOT register 402. The output of these registers are buffered and transmitted to all disc drives in a radially connected control data path by way of control transmitter 414.

Disc status is radially connected to the input of control receiver 416. The output of receiver 416 is stored by DBIN register 404. When required, the IOP (Disc) microcode reads DBIN register 404 by way of I-bus 104. When data is to be written to a disc drive, the data is placed on O-bus 106 by the microcode and stored in DWRT register 408. The DWRT register transfers this data as a 36 bit parallel word to write register 412. Write register 412 converts the data into a serial bit stream and inputs this data stream to data transmitter 420. The data transmitter outputs the serial data stream to the disc drive indicated by PRTEN control lines 422. The state of the PRTEN control lines is determined by PRTEN control signals previously loaded into DBOT register 402. If disc data is to be read, the microcode selects the desired drive by way of PRTEN control lines 422 of DBOT register 402. These control lines enable data receiver 418 and a serial data stream is input to read register 410. Register 410 converts the serial stream into a 36 bit parallel data word and stores it in DRD register 406. This data word is then transmitted to the microcode by way of I-bus 104. While the contents of registers DWRT 408 and DRD 406 are organized as 4 bytes for each register, the control registers contain discrete signals required to operate the disc drives. Table 6 lists and briefly describes the critical control functions of registers DCTL 400, DBOT 402, and DBIN 404.

TABLE 6

| REGISTER | CONTROL SIGNAL | DESCRIPTION |
|---|---|---|
| DCTL | DISABLE ATT | Requests a disc operation be initiated |
| | BYTE COUNT (0-13) | Defines the number of bytes to be read/written |
| | ODINDX | Defines the physical disc track to be read/written |
| | WRTEN | Disc write enable |
| | BYTE SEQ (0-3) | Defines the bytes (1 of 4) to be read/written |
| | R/W SREN | Reset enable |
| DBOT | PRT EN (0-3) | Defines 1 of 4 drives to be read/written |
| | DRV/ADR (0-3) | Address of the selected drive |
| | ODD & SCTR (0-32) | Defines a constant to be used when searching for a particular data pattern |
| | UNTSEL & BUSOUT (0-9) | Defines the disc drive function presently in operation |

TABLE 6-continued

| REGISTER | CONTROL SIGNAL | DESCRIPTION |
|---|---|---|
| DBIN | PORT SECTOR | Port sector status |
| | DRIVE SECTOR | Drive sector status |
| | DCSR (0-3) | Disc drive service request |
| | SELECTED | Indicates a disc drive has been selected |
| | WRTEN | Write enable status |
| | WRTPE | Write error status |
| | IDNX ERR | Read/write index status |
| | SKERR | Seek error status |
| | RDONLY | Drive read mode status |
| | AMFND | Address error status |
| | UNITRDY | Drive ready status |
| | ONLIL | Drive on status |

VI. LSIOP 30

The local communications processor, LSIOP 30, is a low speed input-output processor communicating with system bus 25. It provides all the functions required to support system bus 25 communication with peripheral terminals, such as CRT/printer 41-44 shown in FIG. 1. LSIOP 30 controls the exchange of data between these terminals and system bus 25. This control is defined by the microcode loaded in memory of the LSIOP.

Figure 8:
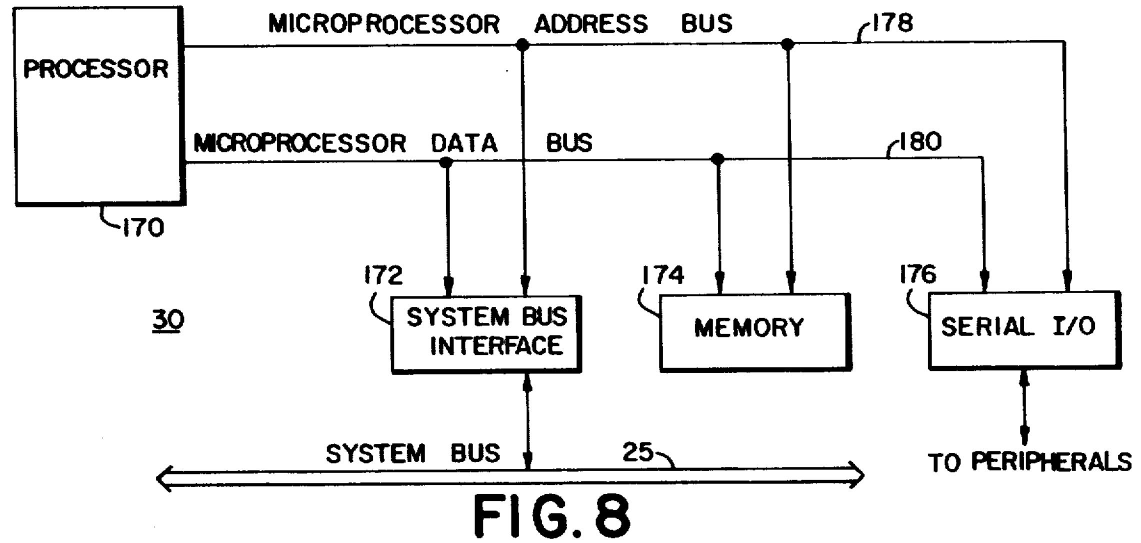
FIG. 8 illustrates in block diagram form the memory and bus interfaces of MOS microprocessor shown in FIG. 5.

Referring to FIG. 8 there is shown conventional MOS microprocessor 170 acting as the control element for LSIOP 30. Also shown are memory 174, which contains the microcode of operating instructions utilized by processor 170; system bus interface 172, which provides a compatible interface between system bus 25 and LSIOP 30; and serial I/O 176, which provides a serial interface between LSIOP 30 and the various peripheral devices, such as terminals 41-44.

Data on system bus 25 is received by system bus interface 172, which transmits it to processor 170. Processor 170 then determines the appropriate channel to which this data is to be transmitted. Once determined, processor 170 reformats the data and transmits it to the desired channel and peripheral device, by way of serial I/O 176. The conversion of data, from parallel to serial, is performed by serial I/O 176. In a similar manner, data from a peripheral device can be transmitted to system bus 25, except that the data is converted from serial to parallel by serial I/O 176, and then processor 170 controls the timing and destination of such data by way of system bus interface 172. Since data on system bus 25 is designated for a particular LSIOP channel, processor 170 must emulate such a channel.

A. Microprocessor 170

Figure 9:
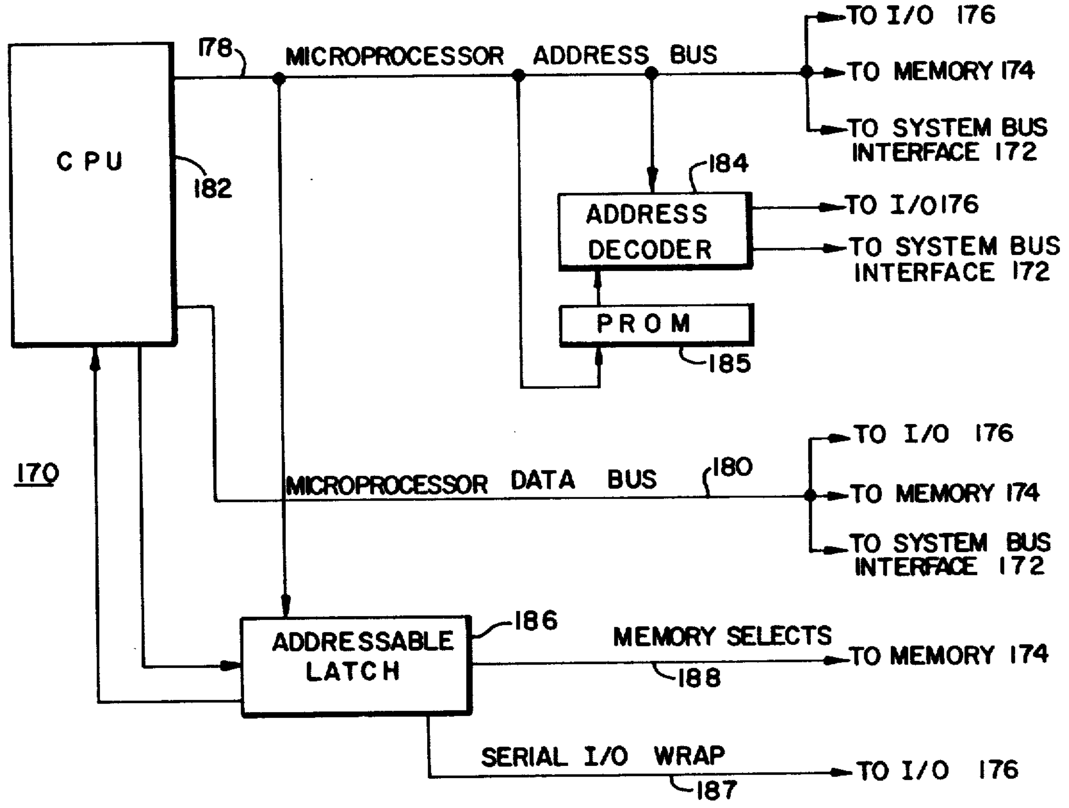
FIG. 9 illustrates in block diagram form the microprocessor of FIG. 8 utilizing an address decoder.

Processor 170, illustrated in FIG. 9, includes conventional central processor unit (CPU)182, address decode logic 184, addressable latch 186, address bus 178, and data bus 180.

Figure 10:
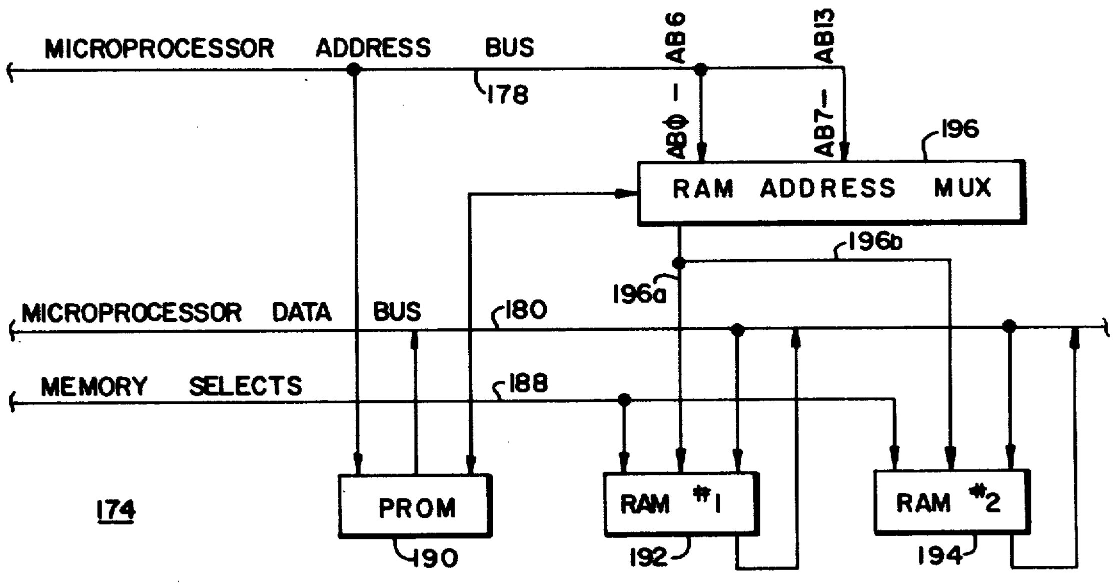
FIG. 10 illustrates in block diagram form an address decoder, as shown in FIG. 9, utilizing one PROM and two multiplexed RAMS which is all part of the memory of the MOS microprocessor shown in FIG. 8.

Address bus 178 is a unidirectional 16 bit wide bus, whose low order bits (AB0 through AB7) are decoded by both address decode logic 184 and addressable latch 186. Address decoder 184 is a conventional 3 to 8 line and 2 to 4 line decoder, and generates I/O select control signals, as specified in Table 7, for use by serial I/O 176 and bus interface 172. Addressable latch 186 includes a conventional addressable latch which generates the control signals shown in Table 8 for serial I/O 176 and bus interface 172. The high order address bits (AB8 through AB15) are distributed to serial I/O 176 for frequency selection and test reporting, and to address decode logic 184. Address decoder 184 utilizes PROM 185 to decode address bits AB8-AB15 into memory select signals for PROM 190, bus interface 172, RAM 192, or RAM 194 (FIG. 10). Data bus 180 is a bidirectional, 8 bit wide bus which transmits and receives data bytes from serial I/O 176, memory 174, and bus interface 172.

TABLE 7

| | LSIOP 30 INPUT/OUTPUT SELECTS | |
|---|---|---|
| AB7-AB15 | READ FUNCTION | WRITE FUNCTION |
| 00100000 | | Software Reset |
| 0001 | | GO Command |
| 0010 | | IOP Bus Enable |
| 0011 | | Clear Bus Interrupt |
| 0100 | | Reset Control Latch |
| 0101 | | Indicator Port Clock |
| 0110 | | Unused Addr. Error Clear |
| 0111 | | (spare) |
| 1000 | NMI Port Status | Set Frequency Device 0 |
| 1001 | Test Port Status | Set Frequency Device 1 |
| 1010 | | Set Frequency Device 2 |
| 1011 | | Set Frequency Device 3 |
| 1100 | P10 Port A Data in Array 210 | |
| 1101 | | P10 Port A Control in Array 210 |
| 1110 | P10 Port B Data in | P10 B Data Out |
| 1111 | | P10 Port B Control |
| 00110000 | Device 0 Rx Data in Controller 202 | Device 0 Tx Data in Controller 202 |
| 0001 | Device 0 Status | Device 0 Commands |
| 0010 | Device 1 Rx Data | Device 1 Tx Data |
| 0011 | Device 1 Status | Device 1 Commands |
| 0100 | Device 2 Rx Data | Device 2 Tx Data |
| 0101 | Device 2 Status | Device 2 Commands |
| 0110 | Device 3 Rx Data | Device 3 Tx Data |
| 0111 | Device 3 Status | Device 3 Commands |
| 10XX | | |
| 11XX | | |

A non-maskable interrupt (NMI) latch, contained in addressable latch 186, captures NMI events until interrogated by CPU 182. NMI events are summarized in Table 9. Maskable interrupts from system bus interface 172 and serial I/O 176 are transmitted directly to CPU 182.

B. Memory 174

LSIOP memory 174, illustrated in FIG. 10, includes PROM 190 organized as a 1K word by 9 bit bank while RAMs 192 and 194 are sectioned into two 16K word by 9 bit banks. Selection of the memory to be addressed is determined by memory selects 188 generated in additional latch 186. Dynamic RAM addressing, by way of lines 196*a*, *b*, is provided by multiplexing address bits AB0-AB6 with AB7-AB13 in RAM address mux 196. During a RAM memory transfer the first 7 bits (AB0-AB6) are latched providing RAM row address selection, and then the AB7-AB13 bits are latched to provide RAM column address selection.

TABLE 8

| AB7-AB0 | FUNCTION |
|---|---|
| 0000 000X | Spare - Reset |
| 0000 001X | Spare - Set |
| 0000 010X | NMI Disable |
| 0000 011X | NMI Enable |
| 0000 100X | False Parity Disable |
| 0000 101X | False Parity Enable |
| 0000 110X | SIO Wrap Disable |
| 0000 111X | SIO Wrap Enable |
| 0001 000X | Bus Address Wrap Disable |
| 0001 001X | Bus Address Wrap Enable |
| 0001 010X | Bus Data Wrap Disable |
| 0001 011X | Bus Data Wrap Enable |

TABLE 8-continued

| AB7-AB0 | FUNCTION |
|---|---|
| 0001 100X | Bus Operating Mode Enable |
| 0001 101X | Bus Standby Mode |
| 0001 110X | Spare - Reset |
| 0001 111X | Spare - Set |

TABLE 9

NMI IDENTIFICATION

| BIT | FUNCTION |
|---|---|
| DB0 | Type Memory Select Bit 0* |
| DB1 | Type Memory Select Bit 1 |
| DB2 | Type Memory Select Bit 2 |
| DB3 | PROM Parity Error or Unused Address Error |
| DB4 | Auxiliary SVP NMI |
| DB5 | Bus Reset Signal |
| DB6 | Parity Error Signal |
| DB7 | System Reset Signal |

*Type Memory Select:

| DB2 | DB1 | DB0 | |
|---|---|---|---|
| 0 | 0 | 0 | PROM 190 |
| 0 | 0 | 1 | Bus Interface 172 |
| 0 | 1 | 0 | RAM #1 192 |
| 0 | 1 | 1 | RAM #2 194 |
| 1 | X | X | (Spare) |

C. Serial I/O 176

Figure 11:
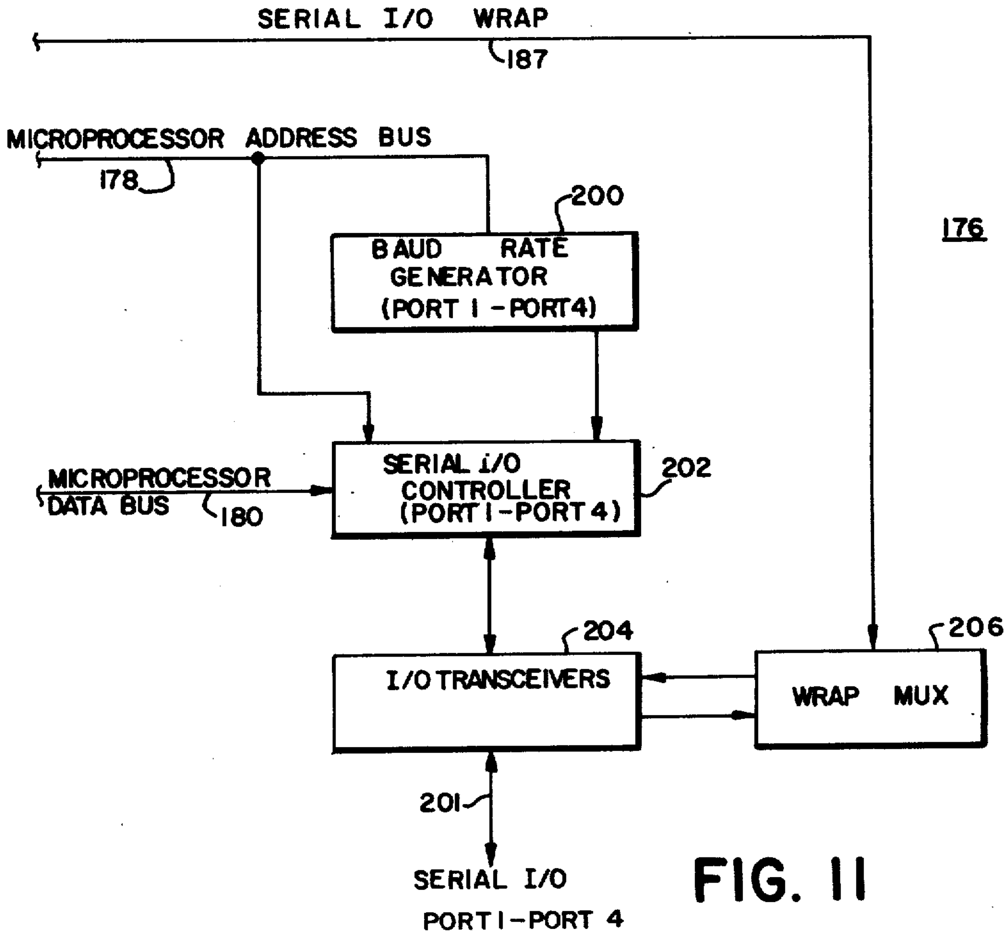
FIG. 11 illustrates in block diagram form the four serial input/output ports of an LSIOP shown in FIG. 1.

As shown in FIG. 11, serial I/O 176 provides LSIOP 30 with four serial input/output ports 201. The serial I/O circuit design is based on a conventional baud rate generator 200 and serial I/O controller 202.

Baud rate generator 200 provides separate baud rates for each I/O port. These baud rates are determined by bits AB8–AB15 of address bus 178 from processor 170. The baud rate frequencies are applied to serial I/O controller 202 together with bits AB0–AB1 of address bus 178 for mode control and bits DB0–DB7 of data bus 180 for data transfers. This information allows controller 202 to transmit or receive serial data from up to four ports by way of I/O transceivers 204. The transceivers are conventional drivers/receivers that satisfy the ANSI RS422/449 interface requirement.

Serial I/O 176 also contains wrap mux 206 which allows serial outputs to be tied to serial inputs. The wrap allows LSIOP 30 to internally test the serial I/O ports and baud rate generators.

D. System Bus Interface 172

Figure 12:
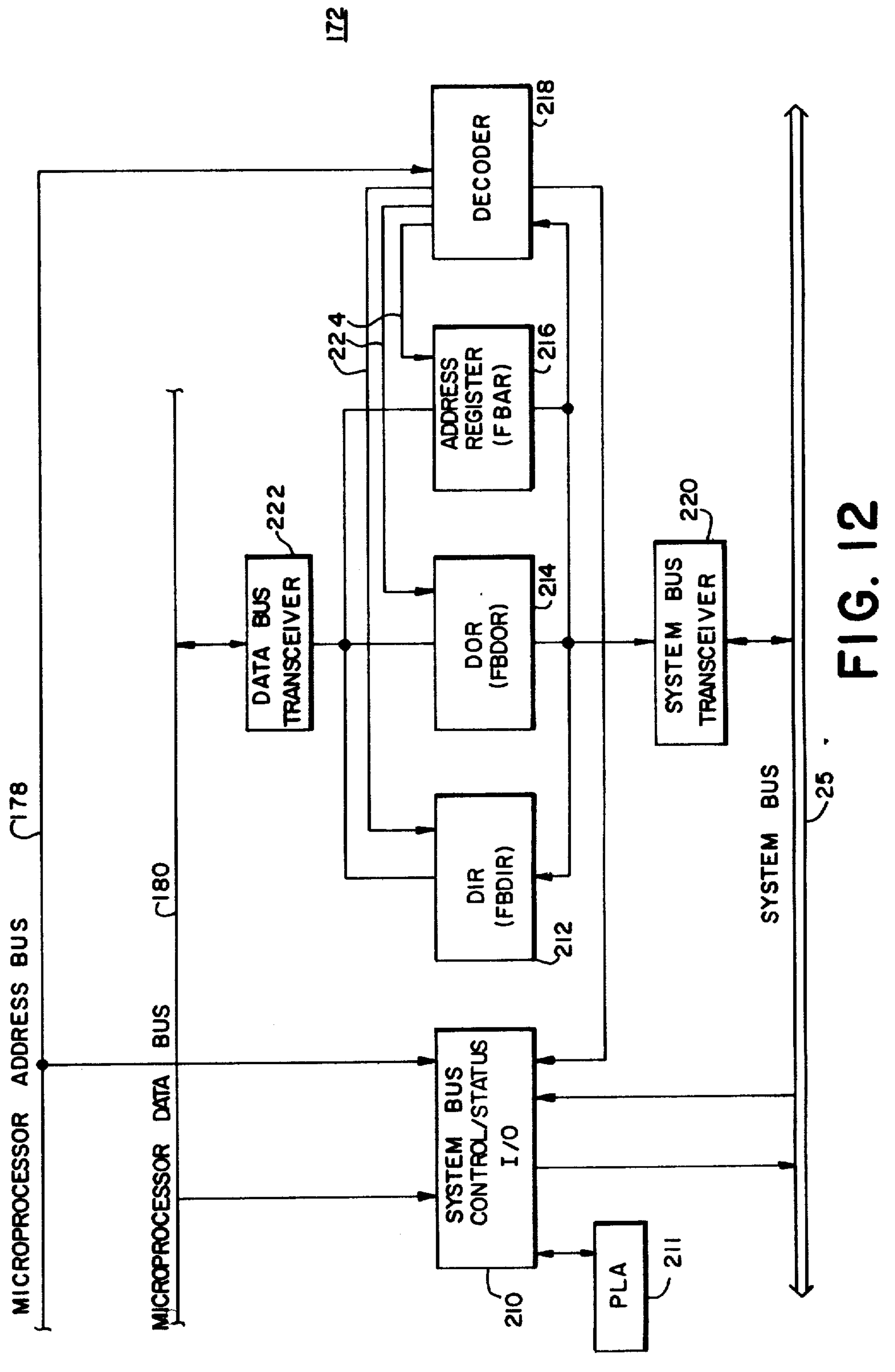
FIG. 12 illustrates in block diagram form and in detail the system bus interface shown in FIG. 8.

System bus interface 172 (FIG. 8), illustrated in FIG. 12, and includes DIR 212, DOR 214, address register 216, decoder 218, control/status logic 210, and associated transceivers 220, 222.

DIR 212 is a memory-mapped, 36 bit, read-only (with respect to data bus 180) register which contains data from a memory 29 read cycle, and a bus 25 cycle in which another system bus member, such as member 26, 27,28, 29, 31, or 32, has written to LSIOP 30. DOR 214 is a memory-mapped, 36 bit, write only (with respect to data bus 180) register which contains the output data to be used in the system bus 25 write cycle. Address register 216 is a memory-mapped, 36 bit, write only (with respect to data bus 180) register which contains the address to be used during the next system bus 25 cycle.

Decoder 218 is a conventional 3 to 8 line and 2 to 4 line demultiplexer and converts address bus 178 bits AB0–AB2 into select signals 224 which activate either DIR 212, DOR 214, or address register 216. The decoder compares incoming addresses on system bus 25, bits 8–15, with internally preset switches and when a match occurs, control/status logic 210 is notified.

Control/status I/O 210 is coupled to programmable logic array (PLA) 211 and is also coupled to system bus 25. PLA 211 is microcoded, as attached hereto, to generate the timing signals required by interface 172 upon receipt of instructions by I/O 210. I/O 210 accepts mode control signals from address bus 178 and data is passed to and from I/O 210 by way of data bus 180. I/0 210 includes a status register that latches system bus status bits MUE, MPV, SBSY, AACK, and SBE. I/O 210 then utilizes this data with information sent to it by way of data bus 180 to generate control register outputs that control interface 172.

E. LSIOP K-Field Definitions

While IP/IOP 28 requires a decoding of a K-field 62 (FIG. 3), LSIOP 30 does not. The reason for this is the dedicated system bus interface register usage by the system bus master read/write, and slave write modes. Bus interface 172 ignores all received K-field bit decodes other than $F_{16}$ and $E_{16}$ (enter standby mode command and operating mode enable command, respectively). In addition, LSIOP 30 does assert K-fields 62 on master read/write bus cycles to IP/IOP 28.

F. LSIOP 31

LSIOP 31 provides all the functions necessary for supporting the operation of magnetic tape drives 45–48, shown in FIG. 1.

The hardware implementation of the LSIOP 31 is identical to that previously described for the LSIOP 30, with the exception of three additional system bus interface registers implemented in LSIOP 31. These registers are the tape address register (TAR), tape data input register (TDIR), and the tape data output register (TDOR).

The TAR contains the system bus address of the MMC 29 location being read from or written to tape drives 45–48. The TAR (not shown in FIG. 12) is coupled between data bus transceiver 222 and system bus transceiver 220, shown in FIG. 12. The TAR is also coupled to decoder 218.

The TDIR (not shown) is coupled among data bus transceiver 222, system bus transceiver 220 and decoder 218. After an LSIOP 31 master read cycle, the TDIR contains data read from an MMC 29 location addressed by the TAR. The TDOR contains data to be written by LSIOP 31 (during a master write cycle) to an MMC 29 location addressed by TAR.

The TDOR is coupled among transceivers 220, 222, and decoder 218.

As described previously, the microcode program located in memory 174 (FIG. 8) determines the functional operation of the LSIOP hardware.

G. LSIOP 32

The unit record processor LSIOP 32 provides all the functions necessary for supporting the operation of line pointers 49, 50 and card I/O devices 51, 52.

The hardware implementation of LSIOP 32 is identical to that previously described for LSIOP 30. The only difference between LSIOP 30 and LSIOP 32 is the microcode program located in memory 174, shown in FIG. 8. It is this microcode that determines the functional operation of the LSIOP hardware.

H. Service Processor—SCP 26

Figure 14:
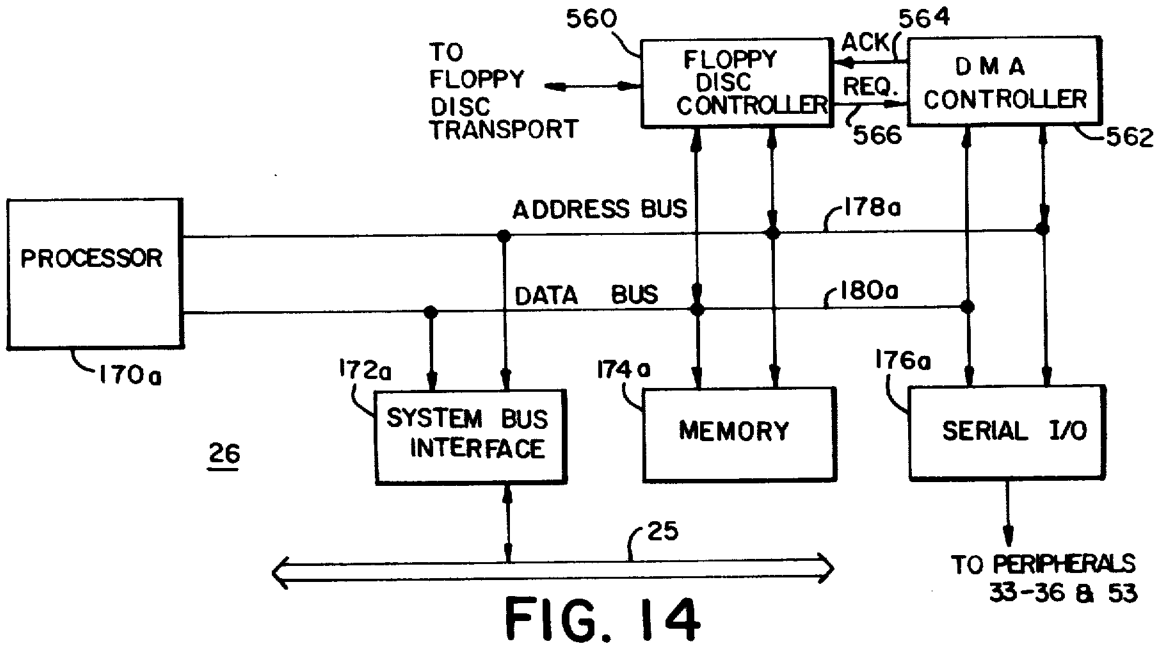
FIG. 14 illustrates in block diagram form the elements of the service and control processor as shown in FIG. 1.

As shown in FIG. 14, SCP 26 provides all of the functions necessary for supporting the nonemulation tasks of system 10 "start-up" following power-on. This includes supporting the operation of microcode floppy disc 33.

The SCP 26 also provides the functions necessary for supporting the channel emulation operation of system console 34, terminal printer 35, optional terminal 36, and modem 53, as shown in FIG. 1.

The structure of SCP 26 is similar to that previously described for LSIOP 30 (and similar elements have similar reference characters plus a subscript) with the exception of the addition of a floppy disc controller 560 and a direct memory access (DMA) controller 562 illustrated in FIG. 14. These two controllers, along with the SCP 26 microcode, support the operation of floppy disc 33.

Figure 15:
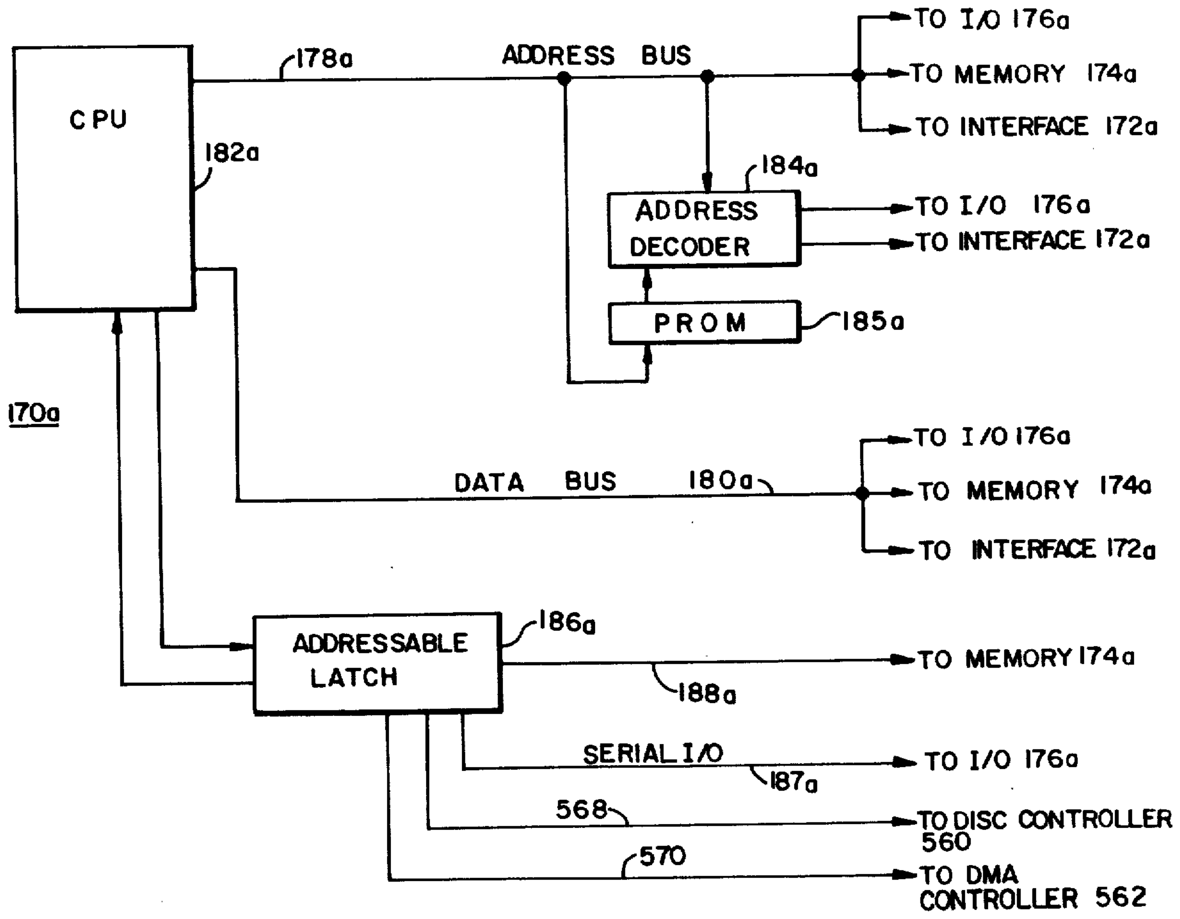
FIG. 15 illustrates in block diagram form the interconnections of the addressable latch and the pathways followed by preset control bits.

The floppy disc controller 560 is a high level controller that relieves the processor 170*a* of many of the control tasks associated with a floppy disc interface. Referring to FIGS. 14 and 15, during typical floppy disc operation CPU 182*a* sets the appropriate control bits in addressable latch 186*a* indicating a floppy disc controller command is on the data bus 180*a*. These control bits are transmitted via the addressable latch outputs 568. Upon receipt of these control bits the controller stores the command presently on the bus 180*a*. The CPU 182*a* will then issue an execute signal via these control bits and the controller will process the stored command. If, for example, the stored command is "READ DATA" the controller will generate all the floppy disc 33 (FIG. 1) control signals required to locate and read this data.

The DMA controller 562 permits a block of data to be read from or written to the floppy disc 33 with minimum supervision by the processor 170*a*. When a DMA operation is required via REQ 566 the controller stores the first and last address of the data block to be transferred. Upon execution of a DMA operation the floppy disc 33 addresses to be read/written will sequentially be provided to the floppy disc controller 560 by the DMA controller 564 via address bus 178*a*. This operation continues without processor 170*a* intervention until the last block address is utilized. The DMA controller 564 then relinquishes control of the floppy disc controller 560.

As in the case of LSIOP 30 the microcode program located in memory 174*a* (FIG. 14) determines the functional operation of the SCP 26 hardware.

VII. MAIN MEMORY CONTROLLER (MMC) 29

The MMC 29 provides random access memory (RAM) for processor system 10. This RAM is accessable to system processors 27–32 by way of system bus 25. MMC 29 also provides the capability of error detection/correction for all memory access operations as described in Appendix III. Also provided by MMC 29 is the system bus arbitrator, which is not functionally part of the memory operation, and has already been described.

Unlike other processors in system 10, MMC 29 can not request bus mastership and in system bus 25 cycles involving a memory function MMC 29 is always a slave. As a slave MMC 29 only accepts two types of messages, memory reference messages and memory control messages, both described below.

A. MMC 29 Messages

A memory reference message is issued by a master processor wishing to communicate with MMC 29 to be read from or written to MMC 29. On the other hand, a memory control message is issued by a master processor when control data is to be written to MMC 29, or control status is to be read from MMC 29. For either type of message a write or read operation is determined by the state of the system bus WCL 0 through WCL 3, described earlier. Bus timing for the memory messages are identical to the interprocessor bus timing previously described except that the message format is slightly modified.

1. Memory Reference Message

Referring to FIGS. 3 and 15, a master processor utilizes a memory reference message when data is to be written to or read from MMC 29. The master, once granted bus control places address data format 72 onto system bus 25 with an S field 64 of 00. The M field 66 of format 72 is a two bit field selecting one of four previously defined operations. The K field 62 of format 72 contains a four key bit memory protect word which is used by key memory 462 of MMC 29 to determine whether the requesting master is permitted access to RAM 468. The A0, A1, A2 fields 68–70 of address format 72 contain the real RAM memory address to be accessed. If recognized by address recognition comparator 454, the master (if this is a write cycle) or the slave (if this is a read cycle) places data word 82 onto system bus 25. The format of data word 82 is shown in FIG. 4 having D0 through D4 each representing an 8 bit byte of data contained at the real memory address location defined in the previous address format 72. The appropriate processor then stores this data and the bus cycle ends.

2. Memory Control Messages

A master utilizes a memory control message when a memory control function (such as read/write key memory or reset memory status) is to be performed by MMC 29. In this case, the master, once granted bus control, places address format 72 onto system bus 25 with an S field 64 of 01. The K field 62 contains a four bit code defining the memory control function to be performed by MMC 29.

TABLE 9A

| K FIELD | DESCRIPTION | ADDRESS FORMAT 72 FIELDS | DATA FORMAT FIELDS |
|---|---|---|---|
| $0_{16}$ | Read/write a 7 bit key into key memory 462 | A0,A1 = key memory address to be read/write | DAL 0-7= key value to be read/written were: DAL 0-3 = Access control bits DAL 4 = Fetch |
| . | | | |
| . | | | |
| . | | | |

TABLE 9A-continued

| K FIELD | DESCRIPTION | ADDRESS FORMAT 72 FIELDS | DATA FORMAT FIELDS |
|---|---|---|---|
| . . . . . . | | | protection bit DAL 5 = Reference bit DAL 6 = Change bit DAL 7 = Parity bit |
| $1_{16}$ | Read/write the 7 bit word associated with ECC 464 | A0,A1,A2 = real memory address of the data word whose syndrome bits are to be read/written | DAL 24-30 = syndrome bits |
| $2_{16}$ | Read/write a data word from MMC 29 while inhibiting the ECC 464 | A0, A1, A2 = real remory address of data to be read/written | DAL 0-31 = four byte data word |
| $3_{16}$ . . | Read the error address register 470 | | DAL 0-7 = protect key DAL 8-31 = memory address |
| $4_{16}$ . | Read the MMC 29 error status register 456 | | DAL 8 = MUE DAL 9 = MCE DAL 10 = multiple MCE |
| $5_{16}$ | Reset MUE status bit when WCL 1 is active | | |
| $6_{16}$ | Reset MCE status bit when WCL 1 is active | | |
| $7_{16}$ | Reset multiple MCE status bit when WCL 1 is active | | |
| $8_{16}$ | Reset key memory parity error status bit when WCL 1 is active | | |
| $9_{16}$ | Reset multi-key parity error status bit when WCL 1 is active | | |
| $A_{16}$ | Read key memory and reset the key reference bit | Same as K field $0_{16}$ | Same as K field $0_{16}$ |
| $E_{16}$ | Commands the MMC 29 to go from a standby mode to an operate mode | | |
| $F_{16}$ | Reset all MMC 29 control and status registers | | |

Each K field code received by MMC 29 causes the MMC to respond with a specific data format 82. Table 9A contains a description of each K field code and its associated address format 72 and data format 82. All fields not defined in Table 9A are assumed to be zero. At the appropriate bus time the master processor stores data format 82 present on system bus 25 and the bus cycle ends.

B. MMC 29 Operation

Figure 16:
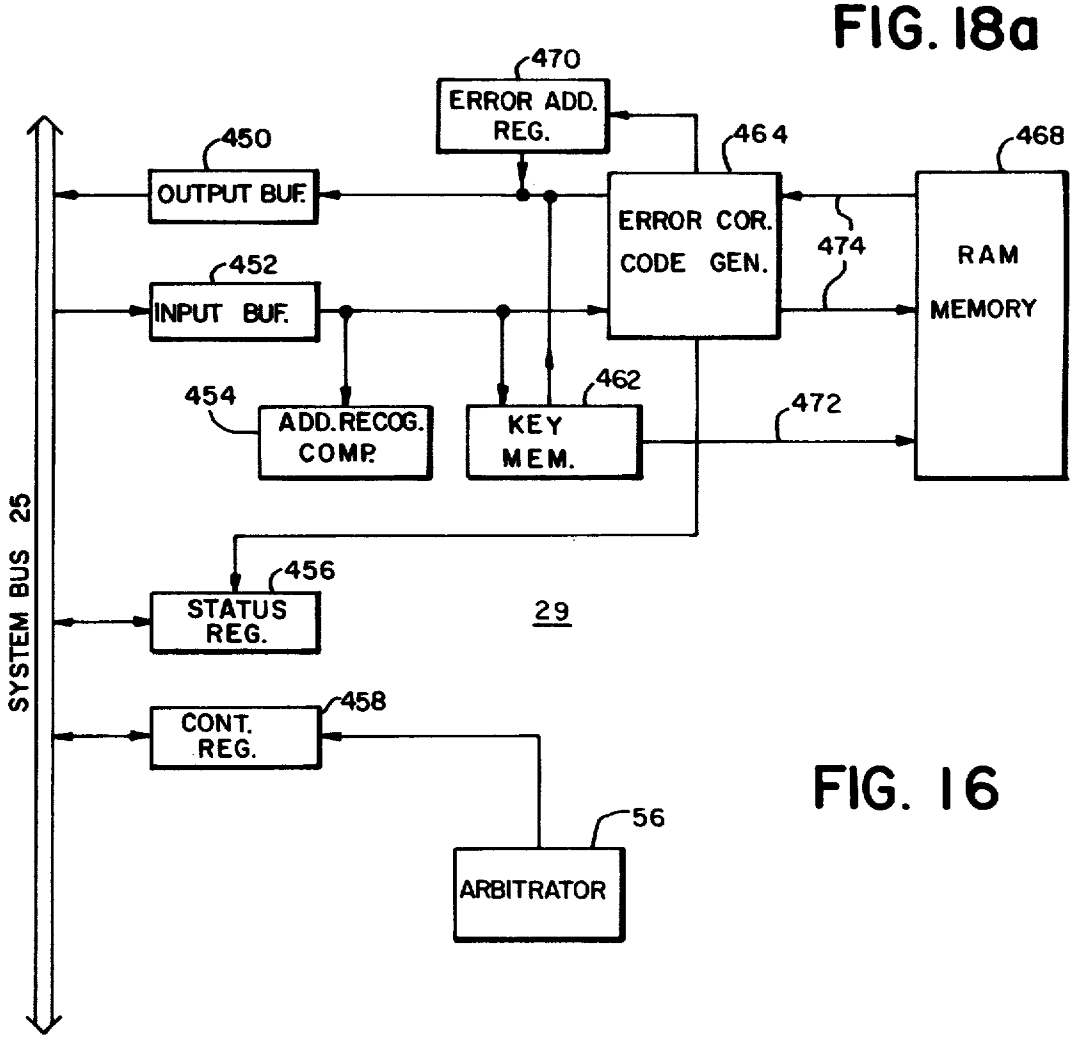
FIG. 16 illustrates in block diagram form the sequence followed when an address word, shown in FIG. 3, is placed on the system bus.

MMC 29 does not contain a microprocessor and, therefore, can only react to messages sent to it by a master processor. Referring to FIG. 16, when a master issues a memory reference address format 72 (S=00) onto system bus 25 the message is detected by input buffer 452. Buffer 452 then applies S field 64 to address recognition comparator 454. In this example, address comparator 454 recognizes the S field of 00 and causes key memory 462 to store the key value and the real memory address at input buffer 452. Key memory 462 compares this key with its internal key and a match indicates that the addresses memory space of RAM 468 is available to the requesting master. Key memory 462 then transmits the real memory address to RAM memory 468 by way of a 16 bit address bus 472. If the WCL's indicate a write operation, the master issues a data word utilizing data format 82 onto system bus 25. Input buffer 452 accepts and transmits these 32 bits of data to ECC generator 464, which utilizes the data to create 7 additional bits. The additiona bits are then used by ECC 464 to correct all single bit errors and detect all double bit errors. The resulting 39 bit data word is placed on a 39 bit memory data bus 474 and stored at the previously defined memory address location.

If the WCL's had indicated a read operation, the previous sequence is identical with the following exception. After the address format is accepted by MMC 29 the 39 bit data word at the addressed memory location is sent to ECC 464 by way of bus 474. The ECC examines the seven ECC bits and determines if an error exists in the 32 bits of data. If no error exists, ECC 464 strips off the seven ECC bits and places the remaining 32 bit data word onto system bus 25 by way of output buffer 450.

It will be understood that if an error is detected by ECC 464, the RAM memory address and protect key of the erroneous data are stored in error address register 470. If the error is a single bit error, ECC 464 corrects the error and sets the MCE status bit in status register 456. If the error is a multiple bit error, ECC 464 sets the MUE status bit in status register 456. In either case, ECC 464 then places the 32 bit data word onto system bus 25 by way of output buffer 450.

When a master issues a memory control address format 72 (S=01) onto system bus 25 the message is detected by MMC 29 by way of input buffer 452. Address recognition comparator 454 decodes S field 64 and initiates a memory control sequence. Address recognition comparator 454 then decodes K field 62. The result of this decoding determines the control data that will be placed in data format 82, as specified in Table 9A, and the internal function that will be executed. For example, if the K field is $3_{16}$, error address register 470 places its contents onto system bus 25 in data format 82 (bit locations are as specified in Table 9A) by way of output buffer 450. If the K field decoded is $5_{16}$ and WCL 1 is active, the MUE status bit in status received 456 will be reset. In this instance no response is required, and consequently, the data format 82 returned to the master is packed with zeros. The bus cycle is then completed and MMC 29 again monitors system bus 25.

VIII. INTERCOMMUNICATIONS BETWEEN PROCESSORS

All of system bus interface registers, illustrated in FIG. 6 and FIG. 12, are utilized to perform processor to processor intercommunications across system bus 25. The following is a description of the manner in which processor to processor intercommunications are performed. Firstly, included is a general description, followed by details of the communications by way of the numerous registers utilized in system 10.

A. General Interprocessor Communications

Referring to FIG. 1 data processing system 10 permits processors 27 through 32 to communicate with one another by way of system bus 25. As mentioned earlier, when two processors are communicating with one another the processor initiating the information transfer is the master while the other processor is the slave. When a processor wishes to initiate an information transfer it must first request to be made bus master. This request is applied to system bus 25 by way of the RQST-L line and is received and processed by the bus arbitrator, located in MMC 29. If the requesting processor has priority, the arbitrator grants bus mastership by activating the GRANT-L signal line on system bus 25. The newly appointed bus master now begins the information transfer by issuing address message 72 onto bus 25 at the AGATE time period of the system bus. The bus master then issued data message 82 onto bus 25 at the DGATE time period. During the previously mentioned AGATE timer period all processors, other than the bus master, monitor system bus 25. When the address contained in the message issued by the bus master matches the address of monitoring processor, the latter assumes the role of slave and accepts the data message appearing on system bus 25 during the DGATE time period. The slave processor stores the data message in its internal data input registers by utilizing the system bus DSTRB-L signal. At this time the information transfer is complete and the bus master relinquishes control over the bus. It will be understood that if the slave processor wishes to reply it must repeat the previously described sequence except that the requesting processor (which was earlier the slave) now assumes the role of bus master.

The application of this protocol to a typical system operation wil now be described. By way of example, IP/IOP 28 requests bus control. When granted bus control, IP/IOP 28 issues a memory read transfer address instruction during the AGATE period addressed to MMC 29, the latter acting as slave. This address instruction contains the address of the main memory location to be read. Subsequently, MMC 29 transfers the contents of the addressed memory location onto bus 25 during the DGATE period. IP/IOP 28 accepts and stores this information in its internal data input register 112 during the system bus DSTRB period.

If the transferred information is, as an example, a channel architectured software instruction requesting the start of an I/O data transfer operation between tape drive 45 and MMC 29 on channel 0, IP/IOP 28 internally constructs the instruction required by IOP 21 to perform this task. This instruction contains the message code for starting I/O operation, and the address of the channel that the I/O data transfer is to utilize. As previously mentioned, the channel is simulated by utilizing emulated channels so that the data processing of system 10 is compatible with channel architectured software. The instruction to IOP 31 further contains the device controller address of tape drive 45, the slave device address of IOP 31, and the channel and address of IP/IOP 28.

When IP/IOP 28 completes the internal construction of the above mentioned IOP instruction, it requests control of system bus 25. When bus control is granted, IP/IOP 28 issues an interprocessor transfer address message onto bus 25 at the AGATE period and an interprocessor data message at the DGATE period. At the AGATE time, the addressed IOP (in this example IOP 31) stores the data message in its data input register 212 at the DSTRB period. At this time, communication between IP/IOP 28 and IOP 31 is complete and IP/IOP 28 relinquishes bus control. Subsequently, IOP 31 processes the transfer address message in accordance with its internal microcode programming. The internal processing results in generation of all control signals needed to transfer data between tape drive 45 and IOP 31, by way of IOP 31 serial I/O port 202. When data is transferred from tape drive 45 to IOP 31, the latter constructs a memory write transfer message. Upon completion of message construction, IOP 31 loads the memory write transfer address and data message in its internal data output register 214, and requests bus control by activating system bus RQST-L. If IOP 31 has priority, the arbitrator in MMC 29 grants it bus control by activating GRANT-L signal line on system bus 25. IOP 31, as master, then transmits memory write transfer address message 72 onto system bus 25 at the AGATE period and memory write transfer data message 82 at the DGATE period. During the AGATE period, MMC 29 recognizes the address in address message 72 and accepts data message 82 during the DSTRB period. MMC 29 then loads the data into its memory location defined by address message 72. IOP 31 then relinquishes bus control.

B. The Registers of IP/IOP 28 System Bus Interface 90

These registers are shown in detail below and also in FIGS. 6a–c. The usages of each register with respect to IP 27, IP/IOP 28 and IOP 28a are also noted. These usages also apply for all IOP's used in system 10.

| | |
|---|---|
| MACSTR 170 | Machine State Register 107 (32 bit)<br>IP 27, IP/IOP 28 Usage - Content set by IP (self) to reflect IP emulation state. The register is periodically read by SCP 26 to update the SCP CRT emulation level Maintenance Panel 34 and furthermore determine if the IP is still operating.<br>IOP 28a Usage - Content set by IOP 28a (self) to I/O Interrupt CSW (0–31). Read by IP 27 during I/O Interrupt service. |
| MNTDOR 105 | Maintenance Data Output Register 105 (32 bit)<br>IP 27, IP/IOP 28 Usage - Content set by IP 27 (self) in response to an IP emulation level Maintenance Panel message from SCP 26. Read by SCP 26.<br>IOP 28a Usage - Content set by IOP 28a (self) to I/O Interrupt CSW (32–63). Read by IP 27 during I/O Interrupt service. |
| FBDOR 103 | System bus 25 Data Output Register 103 (32 bit)<br>IP 27, IP/IOP 28 Usage - Contains the data/message written to the slave IP register 112 or main memory location being addressed by FBAR 101. |
| FBAR 101 | System bus 25 Address Register 101 (32 bit)<br>IP, IP/IOP 28 Usage - Contains the system bus Address of the slave IP register 112 or main memory location being written to or read from. |
| MSTDIR 93 | Master Data Input Register 93 (32 bit)<br>IP 27, IP/IOP 28 Usage - Contains data read from the slave IP/IOP register 103 or main memory location addressed by FBAR 101. This register always presents 'slave busy' if written to as a slave. |
| IOPDIR 95 | IOP Data Input Register 95 (32 bit)<br>IP Usage - No currently assigned usage.<br>IP/IOP 28 Usage - Written to IOP 28a, or self if IP/IOP 28, by IP 27 to request servicing of an I/O instruction. The IOP 28a leaves this register busy until it is prepared to accept another unsolicited I/O service request message. Hence, a 'slave busy' response is acceptable. |
| AUXDIR 97 | Auxiliary Data Input Register 97 (32 bit)<br>IP 27, IP/IOP 28 Usage - Written to IP 27 by IOP 28a in direct response to a prior message from IP 27 to IOP 28a. Since the response is solicited, IOP 28a does not expect to find IP register 97 'slave busy'.<br>IOP 28a Usage - Written to IOP 28a, IP 27 after it has serviced the I/O Interrupt Request issued by IOP 28a. This notifies IOP 28a that the IP's Interrupt Request Register 114 and its own Interrupt CSW Registers MACSTR 107 and MNTDOR 105 are available for a subsequent Interrupt Request. |
| MNTDIR 99 | Maintenance Data Input Register 99 (32 bit)<br>IP 27, IP IOP/28 Usage - Written to by SCP 26 to request IP emulation level maintenance panel functions.<br>IOP 28a Usage - Written to IOP 28a by the IP on a halt I/O Instruction if the IP finds the IOP's IOPDIR register 95 'slave busy'. |
| IRO 111 | Channel 0 Interrupt Request (8 bit)<br>IP 27, IP/IOP 28 - Written to by IOP 28a on Channel 0 to request servicing of an I/O Interrupt. Since there may be more than one IOP 28a per channel, 'slave busy' is an acceptable response. The data written is the I/O address of the interrupting device. Only the device byte of the address is required since the channel is implicitly 0.<br>IOP 28a Usage - Written to IOP 28a by the IP on a Halt Device I/O Instruction to disc drive 0 on IOP 28a, if the IOP finds the IOP's IOPDIR register 95 'slave busy'. |
| IR1 111 | Channel 1 Interrrupt Request (8 bit)<br>IP 27, IP IOP/28 Usage - As IRO except for Channel 1.<br>IOP 28a Usage - As IRO but for drive 1. |
| IR2 111 | Channel 2 Interrupt Request (8 bit)<br>IP 27, IP/IOP 28 Usage - As IR1 but for Channel 2.<br>IOP 28a Usage - As IR0 but for drive 2. |
| IR3 111 | Channel 3 Interrupt Request (8 bit)<br>IP 27, IP/IOP 28 Usage - As IR1 but for Channel 2.<br>IOP 28a Usage - As IR0 but for drive 3. |

C. The Registers of LSIOP 30 System Bus Interface 172

The usages of each register with respect to LSIOP 30 are noted below. These usages also apply to any other LSIOP's in system 10.

| | |
|---|---|
| FBAR 216 | System bus 25 Address Register 216, FIG. 12, (32 bit)<br>Contains the system bus address of the slave IP 27 or IP/IOP 28 register 101 or main memory location being written to or read from. When LSIOP 30 to another LSIOP communication occurs, one of the two LSIOP's must be SCP 26. This occurs during system bringup, maintenance and logout. |
| FBDIR 212 | System bus 25 Data Input Register 212 (32 bit)<br>During an LSIOP 30 master read, the data from the register/location addressed by LSIOP 30's FBAR 216 is read into this register. LSIOP 30 responds 'slave busy' to any subsequent slave writes until it unloads the data read.<br>Written to by IP 27 and IP/IOP 28 (LSIOP 30 Slave Write) to request I/O instruction service and I/O Interrupt CSW storage. LSIOP 30 responds 'slave busy' to any subsequent slave writes until it both unloads the request message and is prepared to accept another instruction.<br>LSIOP 30 does not remain 'slave busy' during the servicing of an I/O channel program. Hence, a 'slave busy' response is acceptable to IP 27 and IP/IOP 28. It reissues the message until accepted by LSIOP 30.<br>Written to by SCP 26 or another LSIOP 31, 32 (LSIOP 30 Slave Write) during system bringup, maintenance or logout. |
| FBDOR 214 | System bus 25 Data Output Register (32 bit)<br>Contains the data/message written (LSIOP 30 master write) to slave IP 27 or IP/IOP 28 register or main memory location being addressed by the LSIOP's FBAR 216. |

D. Interprocessor Messages

Table 10 lists the I/O messages transmitted on system bus from an IP 27, IP/IOP 28 to an LSIOP 30, 31, 32. Table 11 lists the I/O messages transmitted on system bus 25 from an LSIOP 30, 31, 32 to an IP 27, IP/IOP 28.

During I/O instruction messages (00–06) the IP 27 or IP/IOP 28 generally sends the message corresponding to the I/O instruction to the addressed LSIOP 30–32 when processing that I/O instruction. IP 27 or IP/IOP 28 expects a condition code message (80–84) response from the LSIOP, if it did not receive 'Slave Busy' (IOP busy) nor 'No Slave Address Acknowledge' (no IOP at that address). On LSIOP's configured as byte multiplexers 'slave busy' is a transient condition, hence IP 27 or IP/IOP 28 repeats the message until it is accepted or reaches an error timeout limit.

In an 'IPL Instruction' message (07) IP27 or IP/IOP 28 issues the 'IPL Instruction' message to the addressed LSIOP upon receipt of 'IPL' message from SCP 26 by way of its MNTDIR 99. The LSIOP acts upon this 'IPL Instruction' message as it would to an 'SIO Instruction' message except that it assumes the CAW is zero, instead of reading the value at main memory 29 location 4816. SCP 26 initiates the above message sequence when servicing the system control console 'LOAD' command. The latter is also implied by system automatic load.

TABLE 10

| | | IP 27 OR IP IOP 28 TO LSIOP 30-32 MESSAGES | | |
|---|---|---|---|---|
| MESSAGE CODE | MESSAGE FORMAT | IOP CLASS* | K FIELD | MESSAGE DESCRIPTION |
| 00 | 1 | ALL | 5 | SIO Instruction |
| 01 | 1 | ALL | 5 | TIO Instruction |
| 02 | 1 | ALL | 5 | HIO Instruction |
| 03 | 1 | ALL | 5 | TCH Instruction |
| 04 | 1 | ALL | 5 | SIOF Instruction |
| 05 | 1 | ALL | 5 | CLRIO Instruction |
| 06 | 1 | ALL | 5 | HDV Instruction |
| 07 | 1 | ALL | 5 | IPL 'Instruction' |
| 08 | 1 | 1,3 | 5 | Store Interrupt CSW |
| 09 | 1 | 2 | 6 | Interrupt Processed by IP |
| 0A | 1 | 2 | 7 | HIO Instruction on 'Slave Busy' to message 02 above |
| 0B | 2 | 2 | 8 | HDV Instruction on 'Slave Busy' to message 06 above for driver 0 |
| 0B | 2 | 2 | 9 | HDV Instruction on 'Slave Busy' to message 06 above for drive 1 |
| 0B | 2 | 2 | A | HDV Instruction on 'Slave Busy' to message 06 above for drive 2 |
| 0B | 2 | 2 | B | HDV Instruction on 'Slave Busy' to message 06 above for drive 3 |
| 0C-7F | — | — | — | Not Used by I/O |

*IOP Class Definition:
1. IP/DISC - The IP microcode must recognize that it must transfer control to the DISC microcode whenever it sends a message to the DISC to allow the latter to process request. The IP does not expect 'slave busy'. All communications to the DISC are via one DISC register (IOPDIR).
2. DISC - The IP does not expect 'slave busy' be a transient condition. It also uses additional DISC IOP registers for communication.
3. LSIOP - The IP considers 'slave busy' a transient condition and waits for it to go false or a gross timeout to be exceeded. All communications to the IOP are via one IOP register.

TABLE 11

| | | LSIOP 30-32 TO IP 27 OR IP IOP 28 MESSAGES | | |
|---|---|---|---|---|
| MESSAGE CODE | MESSAGE FORMAT | IOP CLASS* | K FIELD | MESSAGE DESCRIPTION |
| 80 | 1 | ALL | 6 | CC = 0 |
| 81 | 1 | ALL | 6 | CC = 1 |
| 82 | 1 | ALL | 6 | CC = 2 |
| 83 | 1 | ALL | 6 | CC = 3 |
| 84 | 1 | ALL | 6 | CC = 1, & Can. Interr. Req. |
| 85 | 1 | 1,3 | 6 | Interrupt CSW Store |
| 86 | 1 | 3 | 8 | Request to Interrupt Channel 0 |
| 86 | 1 | ALL | 9 | Request to Interrupt Channel 1 |
| 86 | 1 | ALL | A | Request to Interrupt Channel 2 |
| 86 | 1 | ALL | B | Request to Interrupt Channel 3 |
| 88-FF | — | — | — | Not Used by I/O |

*IOP Class Definition as per Table 10.

IP 27 or IP/IOP 28 sends the 'Store Interrupt CSW' message (08) to an LSIOP 30-32 in response to the 'Request to Interrupt' (86) message. The response is delayed until IP 27 or IP/IOP 28 is ready to take the interrupt. The LSIOP stores the interrupt CSW and then indicates the CSW has been stored by sending the 'Interrupt CSW Stored' (85) message.

When processing an 'Interrupt Processed by IP' Message (09) from IOP 28a, IP 27 or IP/IOP 28 fetches the CSW from the IOP's MACSTR and MNTDOR. IOP 28a loads these registers with the two CSW words just before it signals IP 27 or IP/IOP 28 with the 'Request to Interrupt' (86) message. After IP 27 or IP/IOP 28 has stored the CSW and unbusied its appropriate Channel Interrupt Request register 111 it signals IOP 28a with this message. It does not expect 'Slave Busy' since the IOP register is dedicated to this function. It also does not expect 'No Slave Address Acknowledge' since it is using the address provided in the 'Request to Interrupt' message. A response to IP 27 or IP/IOP 28 is not required since this message indicates IOP 28a may send another 'Request to Interrupt' message when it has another interrupt to report. This alternate interrupt processing technique is used because IOP 28a may become busy between the time it requests an interrupt to be processed and the time IP 27 or IP/IOP 28 services the interrupt. Hence, if IP 27 or IP/IOP 28 uses the 'Store Interrupt CSW' message it suspends instruction processing until IOP 28a is able to store the CSW.

The 'HIO Instruction on Slave Busy' Message (OA) is sent to IOP 28a if it receives 'Slave Busy' in response to the 'HIO Instruction' message 02. Since IOP 28*a* has a register dedicated to this message, a 'Slave Busy' response indicates a stacked HIO message. Under the latter conditions, since the current HIO may be to a different device, IP 27 or IP/IOP 28 issues a HDV message OB. There is no immediate reply to this message. IOP 28*a* generates the normal interrupt sequence upon termination of the CCW causing IOP 28*a* to be busy.

The 'HDV Instruction on slave Busy' Message (OB) is sent to IOP 28*a* if it receives a 'Slave Busy' in response to the 'HDV Instruction' message 06 or the 'HIO Instruction on Slave Busy' message 0A. An IR register is provided for each drive (drive 0 to 3) on IOP 28*a*. Hence, a 'Slave Busy' indicates a stacked HDV to addressed device, consequently it may be ignored. A dedicated register per drive is required since IOP 28*a* does not immediately unbusy itself in response to either a HIO or HDV. There is no immediate reply to this message. If IOP 28*a* is processing an I/O Channel Program for the addressed device it is terminated at the end of the current CCW. At that time the normal interrupt sequence is generated.

The 'CC=0–3' Messages (80–83) are sent by an LSIOP 30, 31, 32 in response to the I/O Instruction Messages (00–06) from IP 27 or IP/IOP 28. The IP 27 or IP/IOP 28 waits for the response up to an error timeout limit. A 'Slave Busy' response is an error, since the IP 27 or IP/IOP 28 register used is reserved for solicited responses. A 'No Slave Address Acknowledge' is also an error.

The 'CC=1 and Cancel Interrupt Request' Message (84) is sent by an LSIOP 30, 31, 32 in response to the TIO/CLRIO or SIO/SIOF message from IP 27 or IP/IOP 28 if the instruction has caused an interrupt pending in the channel to be cleared. That is the LSIOP has previously sent a 'Request to Interrupt' message, on behalf of the device addressed by this I/O Instruction, and the processor has not serviced that interrupt with the 'Store Interrupt CSW' or 'Interrupt Processed by IP' message. TIO/CLRIO may clear a Channel End Interrupt (CEI), a Control Unit End Interrupt (CUI), a Device End Interrupt (DEI) or Attention Interrupt (AI) for the addressed device. The LSIOP 30, 31, 32 stores the full CSW prior to returning this message. SIO/SIOF may clear a CUI, DEI or AI for the addressed device. LSLIOP30, 31, 32 stores the USB and CSB prior to returning this message. The USB indicates the appropriate status bit (CUE, DE, ATTN) and 'busy'.

LSIOP 30, 31, 32 sends the 'Interrupt CSW Stored' Message (85) after storing an interrupt CSW in response to the 'Store Interrupt CSW' message from IP 27 or IP/IOP 28. Since the response is solicited, a 'Slave Busy' is not expected. Also, a 'No Slave Address Acknowledge' implies IP 27 or IP/IOP 28 is not operational.

LSIOP 30, 31, 32 sends the 'Request to Interrupt Channel 0–3' Message (86) to the appropriate channel Interrupt Register when it has an interrupt pending. 'Slave Busy' is an acceptable response, since another IOP on the same channel may have already sent a 'Request to Interrupt' message, which has yet to be serviced by IP 27 or IP/IOP 28. A 'No Slave Address Acknowledge' implies IP 27 or IP/IOP 28 is not operational. When IP 27 or IP/IOP 28 becomes interruptable, it replies with 'Store Interrupt CSW' or 'Interrupt Processed by IP' message. If a 'Slave Busy' response is received the LSIOP periodically retransmits this message until accepted.

Appendix II contains a list of the I/O messages transmitted on the system bus 25 between the SCP 26 and the IP 27, IP/IOP 28. A description of each message is also included.

IX. TABLE OF COMPONENTS

In the data processing system 10, the following components have been used for the operation and function as described and shown.

| Ref. Numeral | Type/No. of Units | Ref. Numeral | Type/No. of Units |
|---|---|---|---|
| 55a-f | 74S38, 74LS08, 74LS10, 74LS02(2X) 74S10 | 211 | 82S100 |
| 56 | 74S195(2X), 74S74(3X) 74S02, 74S08, 74S10, 74S32, 74S260 | | |
| 84 | 4116-2(18X) | | |
| 92 | SN74LS273 | 212, 214, 216 | SN74LS374(4X) |
| 94 | SN74LS14 | | |
| 96 | SN74LS243 | 218 | SN74LS138 |
| 98 | SN74LS175 | 220 | 8304B(4X) |
| 100 | DP8304B(4X) | 222 | 8304B |
| | | 290 | 74LS74 |
| 108 | SN74LS256 | 310 | SN74LS244 |
| 112,118 | SN74LS670(8X) | 312,316 | SN74S195 |
| 114 | SN74LS670(3X) | 314 | SN74S195(2X) |
| 116 | SN74LS85 | 318,320 | SN74S74 |
| 120 | 74LS240 | 322 | 196608 MHz OSC. 204417-2 |
| 130 | AM2911(4X) | 400,402 | SN74LS273(4X) |
| 132 | AM2901B(8X) | 404 | SN74LS373(3X), SN74LS273(4X), SN74LS153(8X) |
| 134 | 74LS373(2X) | | |
| 138 | SN74S138(2X) | | |
| 139 | SN74S157(2X) | 406 | SN74LS374(4X) |
| 140 | SN74S251 | 408 | SN74S374(4X) |
| 142 | SN74S288(2X) | 410 | SN74S175(2X) |
| 144,146 | SN74S257(4X) | 412 | SN74166 |
| 182 | Z80A | 414 | SN75110(10X) |
| 184 | SN74LS373(2X) | 416 | SN75107A(4X) |

-continued

| Ref. Numeral | Type/No. of Units | Ref. Numeral | Type/No. of Units |
|---|---|---|---|
| 185 | SN74S471 | 418 | SN75107A(9X), SN75108A(5X) |
| 186 | SN74LS138 | | |
| 190 | HMI-7643(5X) | 420 | SN75110(4X) |
| 192,194 | MK4116-2(9X) | 452,450 | 8304B(4X) |
| 196 | SN74S157(2X) | 454 | SN74S85 |
| 200 | COM5016T-5(2X) | 456 | SN74LS244 |
| 202 | Z80A-SIO/O(2X) | 458 | DS8831(2X) |
| 204 | AM26LS31(2X), AM26LS32(2X) | 462 | MCM2114(4X) |
| | | 464 | 74S280(15X), 74S86(4X) |
| 206 | SN74LS157 | | |
| 210 | Z80-PIO | 470 | 74LS373(4X) |
| | | 600 | SN 74LS259(2X) |
| | | 602 | SN74LS112(8X) |
| | | 604 | SN74LS20 |
| | | 606 | 93453, SN74S257 |
| | | 608 | 200750-4, SN74S74 |
| | | 610 | SN74S00, SN74S20 |

APPENDIX I

Field groups: Byte Alignment Enable (P1, BA); Internal Source/Destination Sel (B); External Destination Load Enable (DE); Constant, File Address, Page Number (AC, K); Constant, Page Address, AX Operand (AX = C-F) (N).

Field widths: P 1 | BA | A (1) 4 | B (1)(8) 4 | S 3 | F 3 | D (9) 3 | S1 4 | DE | E (8) 4 | AX (6) 4 | P2 | CS (2,3,4) 7 | AC (5,4,7) 4 | K (7) 8 | N (6) 8 | SC (9) 1 | S2 2

| | Source Select & Byte Alignment Control (A) | B | ALU Source Select R S (S) | ALU Function Select (F) | RALU Destination & Shift Select (D) | S1 | I/O Bus Select: I BUS (DE) | I/O Bus Select: O BUS (E) | Auxiliary Control Field (AX) | Condition Test Select (CS) | Next Addr Control: CS = True | Next Addr Control: CS = False |
|---|---|---|---|---|---|---|---|---|---|---|---|---|
| Ø | KØ | REVEN CONT | A Q | R+S | Q | Byte Rotate | Constant, K, N(8) | Display (Byte 2) | NOP | True | J[K,N] 16 | MPC |
| 1 | R1 | RODD CONT | A B | S-R | NOP | ↓ | Decimal Adjust (THMR) | THMR (Bytes 3) | Invert ALU Carry In | ALU Zero | J[K,N] 16 | J[REG] 16 |
| 2 | R2 | REVEN START | Ø Q | R-S | RAMA | ↓ | Timer / O Bus Latch | Timer | Incr. Counter | ALU Minus | J[K,N] Push 16 | MPC |
| 3 | R3 | RODD START | Ø B | RVS | RAMF | ↓ | Counter/ FILE ADDR | Counter/ FILE ADDR | Decr. Counter | ALU Overflow | J[K,N] Push 16 | J[REG] Push 16 |
| 4 | R4 | REVEN END | Ø A | R∧S | RAMQD | Dble Prec. Shift ↓ | Interrupt/ BA Ctrl | BA Ctrl (Bytes 2&3) | Cond. Incr Counter | ALU Carry | B[N] 8 | MPC |
| 5 | R5 | RODD END | D A | $\overline{R}$∧S | RAMD | Sngl Prec. Shift ↓ | Status | FBAR (FBBDR) | Cond. Decr Counter | Counter Ovfl/Underfl | B[N] 8, Push | MPC |
| 6 | R6 | REVEN PARTIAL | D Q | R∀S | RAMQU | Dble Prec. Shift ↑ | Mode Register | Mode Register (Bits 8-F) | Update Carry Reg | Initial Transfer Valid | B[N4,Y4] 8 | MPC |
| 7 | R7 | RODD PARTIAL | D Ø | $\overline{R∀S}$ | RAMU | Sngl Prec. Shift ↑ | FBDIR | FBDOR (MAESTR) | Seq. Reg. Load Enable | Extra Transfer Required | B[N6,M,Z] 8 | MPC |
| 8 | R8 | Single MODE REGISTER Bits: 00 F Bus R/W; 01 FBDOR W.A. Select; 02 I/O Mode; 03 I/F Trancvr Dis.; 04 I/F Error Ena.; 05 Spare; 06 Spare; 07 Spare | 10 Allow OBus Latch; 11 Dec Adj/TMMR Sel; 12 Allow Stack Err.; 13 Spare; 14 Spare; 15 Allow Status Chng; 16 Ena Halt/HSP Halt; 17 FILE ADDR Mode Bits | | | | FILE | FILE | I/O | Master F Bus Cycle in Progress | J[Y] 16 | MPC |
| 9 | R9 | | | | | | Spare | Spare | I/O | F Bus Check | J[REG] Push 16 | MPC |
| A | RA | | | | | | I/O | I/O | Spare | F Bus Data In Reg Full | J[REG], 16 | MPC |
| B | RB | | | | | | ↓ | ↓ | Spare | IOP DIR Busy | Repeat | MPC |
| C | RC | | | | | | ↓ | ↓ | Spare | Slave F Bus Cycle In Progress | Rtrn | MPC |
| D | RD | Pair Mode Register Bits: 0A-0B Channel Ø-3 Interrupt Req. Reset; 0C,0D DIR Rst Ø,1; 0E,0F FBDIR R.A. Ø,1 | 18,19 FILE ADDR MD Bit 1,2; 1A,1B BARU Ø,1; 1C,1D Spares; 1E,1F MULT, DIV Ena | | | | ↓ | ↓ | External Dest. Byte Wr [N] | Spare | Rtrn, Pop | MPC |
| E | RE | | | | | | ↓ | ↓ | I Bus Mask [N] | Spare | Rtrn | MPC, Pop |
| F | RF | | | | | | ↓ | ↓ | Control Strobe [N] | Spare | Spare | Spare |

Shift Control:

| Dø = Ø | Dø = 1 |
|---|---|
| 0 Byte Rotate | Circulate Bit |
| 1 Byte Rotate | Arithmetic Bit Shift |
| 2 Byte Rotate | Logic 1 Bit Shift |
| 3 Byte Rotate | Logic Ø Bit Shift |

(1) When BA=1, Byte Alignment hardware drives the Byte Rotate Mux (SC) and the 2901 A, B & D fields (2) CSØ=1 inverts Condition being tested (3) CS $20_H$-$3F_H$ = O Bus Ø-31
CS $60_H$-$7F_H$ = $\overline{\text{O Bus Ø-31}}$ (4) CS $10_H$-$1F_H$ & $50_H$-$5F_H$ are reserved for I/O (5) Constant

| ACØ | CONSTANT |
|---|---|
| = Ø | ØØKØ |
| = 1 | ØØKN |

(6) N = Page Addr for ACØ = Ø
- I Bus Nybl Mask for AX = E
- Control Strobe # for AX = F
- Dest. Byte Write for AX = D (File)

(7) K = Page Number for AC < 4
- File Addr Per Note 1Ø

(8) O Bus Addr = B if:
$[(D=Ø \vee D=1) \wedge (\overline{S=1} \wedge \overline{S=3})] \vee BA=1$
else O Bus Addr = E (9) Dø=1: Enable Int. Reg Bit Shift (Ø Byte R...)
=Ø: Enable I Bus Rotate Mux's

(10) FILE ADDR MSD/LSD

| MR18,19 | MR17=Ø | MR17=1 |
|---|---|---|
| ØØ | KA/KL | EX/KL |
| Ø1 | KM/CL | ØX/CL |
| 1Ø | KM/DZ | ØX/56 |
| 11 | CH/CL | CH/KL |

APPENDIX II

Messages transmitted over system bus 25 via data format 82 between SCP 26 and IP 27, IP/IOP 28 will be formatted as follows:

| MESSAGE CODE | | SLAVE DEVICE CHANNEL | | SLV CHANNEL | | DETAIL | | MASTER CHANNEL/ DEVICE CHANNEL | |
|---|---|---|---|---|---|---|---|---|---|
| 0 | 7 | 8 | 15 | 16 | 17 | 18 | 21 | 22 | 31 |

WHERE: bito = 1; SCP IP
bito = 0; IP SCP

During the following description IP 27 and IP/IOP 28 are functionally interchangable therefore only IP 27 will be indicated.

For SCP 26 to IP 27 data transfers messages requiring data words larger than the message detail field will use a special "Data" message to transfer the necessary words to the IP. The Data message will use the code 9D and will have the following format:

| 9D | | not used | | 16-bits data | |
|---|---|---|---|---|---|
| 0 | 7 | 8 | 15 | 16 | 31 |

When more than 16 bits (half-word) of data must be transferred, the SCP 26 will send multiple Data messages. When multiple Data messages are required, the data value will be transmitted most-significant half-word first. The IP 27 will be required to store all half-words in a temporary location until the complete data field is assembled. Each Data message will be acknowledged by the IP 27.

The transfer of data from the IP 27 to the SCP 26 will be accomplished via the Maintenance DOR, Figs. 6C, 105, on a full-word basis.

Table II-1 lists all SCP 26 to IP 27 message codes and a description of each message is discussed in the following paragraphs.

Code: 8F—Continue: The Continue message is sent to the IP 27 in multi-word read operations.

Code: 90—Stop: Places the IP 27 in tthe "emulation stop" state. The Stop message is *not* acknowledged by the IP 27.

Code: 91—Go: Places the IP 27 in the "emulation run" state.

Code: 92—Enable Single Step: Places the IP 27 in Single Step mode. If the IP 27 is not in the "emulation stop" state, a NAK (not acknowledged) is sent to the SCP 26.

Code: 93—Disable Single Step: Takes the IP 27 out of Single Step mode. If the IP 27 is not in the "emulation stop" state, a NAK is sent to the SCP 26.

Code: 94—Restart: Instructs the IP 27 to perform an IBM "Restart" operation.

Code: 95—Store Status: Instructs the IP 27 to perform an IBM "Store Status" operation.

Code: 96—Set MACRO MASP: Sends a full-word of MACRO-MASP data to IP 27.

TABLE II-1

| MESSAGE CODE | MESSAGE DESCRIPTION |
|---|---|
| 8F | Continue |
| 90 | STOP |
| 91 | GO |
| 92 | Enable Single Step |
| 93 | Disable Single Step |
| 94 | Restart |
| 95 | Store Status |
| 96 | Set MACRO MASP |
| 97 | Clear MACRO MASP |
| 98 | IPL |
| 99 | Enable/disable TOD Set |

TABLE II-1-continued

| MESSAGE CODE | MESSAGE DESCRIPTION |
|---|---|
| 9A | Dump Status |
| 9B | Convert Virtual To Real |
| 9C | Read General Registers |
| 9D | Data Message |
| 9E | Read FP Registers |
| 9F | Write General Registers |
| A0 | Write FP Registers |
| A1 | Read Control Registers |
| A2 | Write Control Registers |
| A3 | Read PSW |
| A4 | Write PSW |
| A5 | Interrupt Key |
| A6 | Interval Timer On/Off |
| A7 | Purge TLB |
| A8 | Main Memory Reset |
| A9 | Start Memory Test |
| AA | Start Disc Test |
| AB | Start Bus-Wrap Test |
| AC | Microcode Reset |
| AD | Set/Verify Device Address |
| AE | Set/Clear Message Timeout Flag |
| AF | Set IOP Channel Configuration |

Code: 97—Clear MACRO MASP: Instructs the IP 27 to disable MACRO MASP detection logic.

Code: 98—IPL: Instructs the IP 27 to perform an IBM "Load".

Code: 99—Enable/Disable TOD Set: Instructs the IP 27 to set/clear its ETODSET and EMULTSET flags.

Code: 9A—Dump Status: IP 27 sends internal registers to SCP 26. The contents of the dump is as follows:

| WORD NO. | CONTENTS |
|---|---|
| 0 | Number of data words to follow (293 for IP 27) |
| 1-16 | Registers 0-F in IP 27 |
| 17-20 | I-Bus 0-3 |
| 21-24 | I-Bus 4 |
| 25-26 | I-Bus 5-6 |
| 27-29 | I-Bus 7 |
| 30-37 | I-Bus 8-F |
| 38-293 | File Locations 00-FF |

If not in the 'emulation-stop' state, IP 27 sends NAK to SCP 26.

Code: 9B—Convert Virtual to Real: A full-word of data containing the virtual address to be translated is sent to the IP 27. IP 27 performs translation and returns 2 full-words to SCP 26. If the IP 27 is not in the 'emulation stop' state a NAK is sent to the SCP 26.

Code: 9C—Read General Registers (GR): IP 27 receives the starting GR # (0-F) in the message field and sends GR's to SCP 26. If the IP 27 is not in 'emulation-stop' state, a NAK is sent to the SCP 26.

Code: 9D—Data Message: Previously described.

Code: 9E—Read FP Registers: IP 27 receives starting FP # (0, 2, 3, 6) in the message field and sends FP registers (full-word at a time) to SCP 26. If the IP 27 is not in 'emulation stop' state, a NAK is sent to the SCP 26.

Code: 9F—Write General Register (GR): IP 27 receives GR # (0-F) in the message field and a full-word of data from the SCP 26, and writes the specified GR. If the IP 27 is not in 'emulation-stop' state, a NAK is sent to the SCP 26.

Code: A0—Write FP Register: IP 27 receives FP # (0, 2, 3, 6) in the message field and two full-words of data from the SCP 26, and writes the specified FP register pair. If the IP 27 is not in 'emulation stop' state, a NAK is sent to the SCP 26.

Code: A1—Read Control Registers: Functionally identical to Code 9C.

code: A2—Write Control Register: Functionally identical to Code 9F.

Code: A3—Read PSW: IP 27 sends two full-words of data to SCP 26, containing the current contents of the PSW. If the IP 27 is not in the 'emulation-stop' state, a NAK is sent to the SCP 26.

Code: A4—Write PSW: IP 27 receives two full-words of data from the SCP 26 and writes the PSW. If the IP 27 is not in 'emulation-stop' state, a NAK is sent to the SCP 26.

Code: A4—Write PSW: IP 27 receives *two* full-words of data from the SCP 26 and writes the PSW. If the IP 27 is not in 'emulation-stop' state, a NAK is sent to the SCP 26.

Code: A5—Interrupt Key: IP 27 emulates the pressing of the IBM Interrupt Key.

Code: A6—Interval Timer On/Off: IP 27 turns interval timer on/off depending on the non-zero/zero state of the message field.

Code: A7—Purge TLB: IP 27 simulates the execution of an IBM "PTLB" instruction. If the IP 27 is not in 'emulation-stop' state, a NAK is sent to the SCP 26.

Code: A8—Main Memory Reset: IP 27 performs a "Memories Reset" on Main Memory Controller 29. In addition, IP 27 sends a full-word of status data to the SCP 26.

Code: A9—Start Main Memory Test: Instructs the IP 27 to start a MMC 29 test.

Code: AA—Start Disc Test: Instructs the IP 27 to start a disc test.

Code: AB—Start Bus-Wrap Test: Instructs the Ip 27 to initiate a bus-wrap test.

Code: AC—Microcode Reset: IP 17 perform an "IP Microcode Reset".

Code: AD—Set/Verify Device Address: IP 27 extracts and saves the SCP 26 device address and channel # from the message bits 22-31 and sends the following message to the SCP 26 in place of an acknowledge.

| B 7 | | SCP DVC | | IP DVC MASK | | IP DVC From Status Register | |
|---|---|---|---|---|---|---|---|
| 0 | 7 | 8 | 15 | 16 | 23 | 24 | 31 |

Code: AE—Set/Clear Message Timeout Flag: IP 27 sets/clears the message timeout flag depending on the non-zero/zero state of the message field. If the IP 27 is not in the 'emulation-stop' state, a NAK is sent to the SCP 26.

Code: AF—Set IOP Channel Configuration: IP 27 receives *three* half-words from SCP 26 and writes the IOP Channel configuration words. If the IP 27 is not in the 'emulation-stop' state, a NAK is sent to the SCP 26.

APPENDIX III

The error correction code generator is able to correct all signal bit errors and indicate the existence of a double bit error. Higher order errors can create problems in that if they are odd (number of bits in error is odd number) then erroneous correction could possibly result. Even number of bits in error will be detected as a double bit error and uncorrectable.

The Table III-1 shows the scheme used to generate the check bits. Each data bit affects three check bits and the seven check bits taken three at a time.

$$C_3^7 = \frac{7!}{3!4!} = 35 \text{ unique addresses.}$$

The existence of a single bit error means that one of the 35 unique addresses will be generated when the comparison is made between the check bits which are generated from the data as compared to the stored check bits. A set of PROMs are used to decode the address which is generated from the difference between the generated versus stored check bits (Table III-2).

The decoding table is generated by taking the "Exclusive OR" of all bits which have a "1" in the respective check bit column of Table III-1. The "Excusive OR" of the check bit with the data that generated that bit yields the syndrome bits. If there are no errors, then all syndrome bits are zero. The existence of non zero syndrome bits means an error exists and the syndrome bits address the bit in error if it is a single bit error.

The PROMs are programmed to decode the syndrome bits and select the proper "Exclusive OR" gate for inverting the bit error.

The error correcting logic checks two additional areas to guarantee performance. the first problem area concerns the validity of the data being checked. The data when received from the system bus 25 must pass through various logic elements before the check bits are generated. Any error that is introduced before the check bits are generated would pass undetected. The erroneous data bit would generate check bits which are valid for that bit being in error and that is what would be stored in memory and also what should be recovered when the memory is read. The ECC generator, however, is able to handle this problem by selectively grouping the data bits for generation of the check bits.

The "Exclusive OR" of the data bits is in actuality a parity tree. The generation of the seven check bits is done by having four of the parity trees checking the byte parity of the data as an intermediate step. If the parity agrees with the system bus 25 parity, then the data in the error correction generator is assumed valid and any broken elements in the error correcting logic will be detected by normal ECC channels. The second check which is performed is when a single bit error is detected (syndrome bits are not equal to zero). The error correction logic is activated whenever non-zero syndrome bits occur and a check is made after any correction to verify that the syndrome bits have gone to zero. If the syndrome bits have not gone to zero, then an uncorrectable error exists and the memory uncorrectable status bit is set (MUE). The existence of an uncorrectable error, either because of broken hardware or due to multiple bits in error, causes the data in memory to be left unchanged.

TABLE III - 1

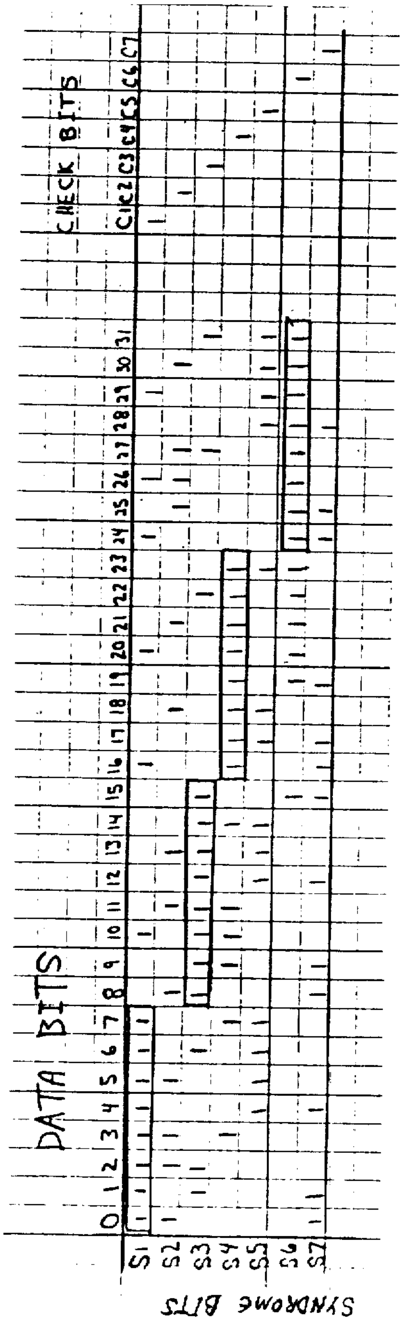

TABLE III - 2

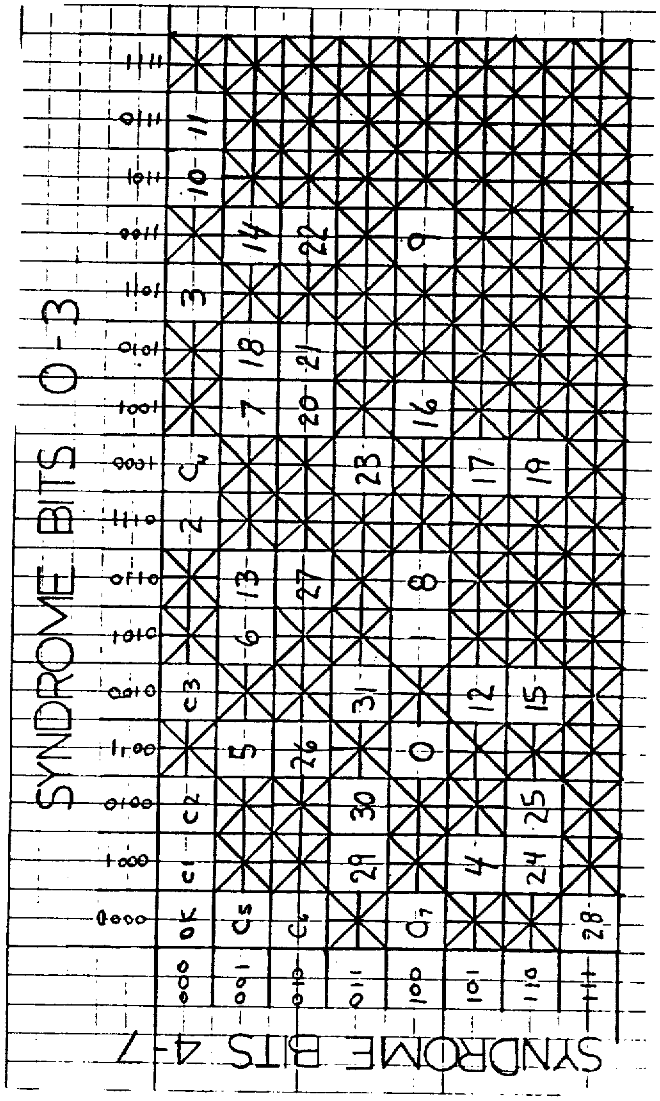

What is claimed is:

1. A single synchronous system bus for a plurality of distributed processors which emulate multiple channels of a multichannel system using multichannel software instructions comprising (a) means for distributing each channel for the multichannel system directly to all of the distributed processors by way of the single synchronous system bus, (b) means for granting control of the entire system bus to one of said distributed processors to become the master processor of all the remaining distributed processors, (c) means for transmitting an address word onto said single synchronous system bus from said master processor directed to each of said remaining distributed processors, said address word containing the address of any emulated channel of said master processor and the address of any one of said remaining distributed processors to become the slave processor, (d) said slave processor including means for receiving and determining whether the address word on said single synchronous system but contains its respsective address, (e) said slave processor being coupled to a plurality of peripheral devices, (f) means for transmitting a data word onto said single synchronous system bus between said master processor and said slave processor, (g) said master processor including means for relinquishing bus control, and (h) said master processor converting the multichannel software into the address and data word formats of said synchronous system bus, said slave processor having means responsive to said data word (a) for generating control signals to transfer data from at least one of said peripheral devices to said slave processor and (b) for producing an address and data word destined for another distributed processor in accordance with the multichannel software, said slave processor requesting and becoming master processor.

2. The single synchronous system bus of claim 1 in which said master processor includes means for placing on said synchronous system bus a write control for determining whether said slave processor is to perform a read or write operation, said write control placed on said synchronous system bus after said granting of bus control.

3. The single synchronous system bus of claim 1 in which there is provided means for transmitting said data word from said master processor to said slave processor for completing a system bus write cycle.

4. The single synchronous system bus of claim 1 in which there is provided means for transmitting said data word from said slave processor to said master processor for completing a system bus read cycle.

5. The single synchronous system bus of claim 1 in which said master processor includes field formatting means for generating said address word formed of a plurality of fields.

6. The single synchronous system bus of claim 1 in which there is provided means coupled to said bus control granting means and said address word transmitting means for placing said address word and said data word onto said synchronous system bus after said granting of bus control to said master processor.

7. The single synchronous system bus of claim 6 in which there is provided interval means for providing a gate signal onto said system bus indicating an interval during which both said address word and said data word may be placed on said system bus.

8. The single synchronous system bus of claim 5 in which the field formatting means includes means for specifying the bus cycle transfer function to be performed by said slave processor.

9. The single synchronous system bus of claim 3 in which there is provided message coding means for providing said data word with a coded instruction that specifies the function to be performed by said slave processor.

10. In a computer system for emulating multiple channels of a multichannel system using multichannel software written for said multichannel system comprising (a) a single synchronous system bus, (b) a plurality of distributed processors, each of said distributed processors directly coupled to each other by said single synchronous system bus, each of said processors having means for emulating any distributed channel of the multichannel system where each channel is directly distributed among all of the distributed processors, (c) at least one distributed processor performing the dual function of synchronous system bus controller and device controller coupled to a plurality of peripheral devices, said peripheral devices transferring information on dedicated channels, (d) means for directly transferring information between said bus controlling processor and another of said distributed processors, both processors formatting and timing said transferred information for transfer to said synchronous system bus wherein said transferred information includes address information used for identifying the source and destination of said transferred information, (e) said bus controlling processor having means for accepting and converting multichannel software instructions from said multichannel system into the address and data formats of said synchronous system bus, and (f) said other processor having means for recognizing and accepting said converted instructions and means for reformatting said instructions into the format of a selected device, said other processor reformatting and transferring information from the selected device to a multichannel configured destination.

11. A computer system as recited in claim 10 wherein said synchronous system bus includes data, address control conductor means for transferring data, address and control information between said plurality of distributed processors.

12. A computer system as recited in claim 11 wherein said plurality of distributed processors include request means for transmitting request signals onto said control conductor means for requesting control over said synchronous system bus.

13. A computer system as recited in claim 12 in which there is provided a main memory controller including arbitration means for granting control to one of said requesting processors, said arbitration means having means responsive to said request means by transmitting a grant signal onto said control conductor means.

14. A computer system as recited in claim 13 wherein said arbitration means includes interval gating means for issuing an interval gate into said control conductor means indicating an interval during which said bus controlling processor can transfer information onto said system bus.

15. A computer system as recited in claim 14 wherein said bus controlling processor includes address word formatting means and data word formatting means responsive to said interval gating means for transmitting an address word and a data word onto said data conductor means.

16. A computer system as recited in claim 13 wherein said bus controlling processor includes address word formatting means and said other processor includes data word formatting means responsive to said interval gating means for transmitting an address word followed by a data word onto said data conductor means.

17. A computer system as recited in claim 11 wherein there is coupled to said control conductor means write control means for determining whether said controlling processor desires to read or write data from another of said plurality of distributed processors.

18. A computer system as recited in claim 15 wherein said, address word formatting means includes means for formatting a plurality of fields within said address word for identifying the function to be performed during a bus transfer cycle.

19. A computer system as recited in claim 15 wherein said data word formatting means includes message coding means that codes the function to be performed by said other processor.

20. In a computer system for emulating multiple channels of a multichannel system using multichannel software instructions written for said system, a plurality of distributed processor means coupled to a single synchronous system bus, each of said processors comprising (a) means for emulating a distributed channel of the multichannel system, (b) device controller means for controlling at least one peripheral device coupled to at least one of said processors, said peripheral device transferring information on a dedicated distributed channel, (c) means for requesting bus control for transferring said information onto said single synchronous system bus destined to another processor means coupled to said system bus, said other processor means acting as a slave processor, (d) means for transmitting an address word onto said synchronous system bus, said address word containing the address of said slave processor, (e) means for thereafter transmitting a data word onto said synchronous system bus, said data word destined to said slave processor, (f) write control means for transmitting a write control signal onto said synchronous system bus for notifying said slave processor whether a write or read operation is to be performed, (g) address word formatting means for formatting a plurality of fields within said address word identifying the function to be performed during a bus transfer cycle, (h) message coding means coupled to said synchronous system bus for receiving said data word and identifying the function to be performed by said slave processor, and (i) means for relinquishing bus control.

21. The processor of claim 20 wherein there is included means for accepting and converting said multichannel software instructions into the instruction format of said synchronous system bus.

22. The processor of claim 21 wherein said slave processor has storage means for storing said multichannel software instructions wherein said slave processor (a) converts said multichannel software instructions in accordance with its microcode programming, (b) generates control signals to transfer data from said peripheral device to said slave processor, and (c) produces an address word and a data word destined for another distributed processor in accordance with the multichannel software instruction, the distination processor requesting and becoming bus master and having means for executing said multichannel software instructions.

* * * * *